US006866557B2

(12) United States Patent
Randall

(10) Patent No.: US 6,866,557 B2
(45) Date of Patent: Mar. 15, 2005

(54) APPARATUS AND METHOD FOR PRODUCING AMBULATORY MOTION

(76) Inventor: Mitch Randall, 2630 Hawthorne Pl., Boulder, CO (US) 80304

( * ) Notice: Subject to any disclaimer, the term of this patent is extended or adjusted under 35 U.S.C. 154(b) by 0 days.

(21) Appl. No.: 10/613,915

(22) Filed: Jul. 2, 2003

(65) Prior Publication Data

US 2004/0063382 A1 Apr. 1, 2004

Related U.S. Application Data

(60) Provisional application No. 60/394,057, filed on Jul. 2, 2002, and provisional application No. 60/445,981, filed on Feb. 7, 2003.

(51) Int. Cl.[7] ............................................. A63H 30/04
(52) U.S. Cl. ....................................... 446/356; 446/330
(58) Field of Search ............................... 446/330, 356, 446/353, 368, 377, 390, 376

(56) References Cited

U.S. PATENT DOCUMENTS

| 1,511,928 A | 10/1924 | Zboril |
| 1,574,679 A | 2/1926 | Nilsson |
| 2,827,735 A | 3/1958 | Grimm, Jr. |
| 3,331,463 A | 7/1967 | Kramer |
| 3,680,395 A | 8/1972 | Douglas |
| 4,503,924 A | 3/1985 | Bartholet et al. |
| 4,527,650 A | 7/1985 | Bartholet |
| 4,629,440 A | 12/1986 | McKittrick, Jr. et al. |
| 4,662,465 A | 5/1987 | Stewart |
| 4,738,583 A | 4/1988 | Macconochie et al. |
| 5,040,626 A | 8/1991 | Paynter |
| 5,121,805 A | 6/1992 | Collie |
| 5,124,918 A | 6/1992 | Beer et al. |
| 5,423,708 A * | 6/1995 | Allen .......................... 446/356 |
| 5,762,153 A | 6/1998 | Zamagni |
| 5,857,533 A | 1/1999 | Clewett |
| 6,238,264 B1 * | 5/2001 | Kazami et al. ............. 446/356 |
| 6,488,560 B2 * | 12/2002 | Nishikawa ................... 446/356 |
| 6,602,106 B2 * | 8/2003 | Cheung ....................... 446/330 |
| 2001/0054518 A1 | 12/2001 | Buehler et al. |

FOREIGN PATENT DOCUMENTS

JP          60259580       12/1985

* cited by examiner

Primary Examiner—Derris H. Banks
Assistant Examiner—Jamila O Williams
(74) Attorney, Agent, or Firm—James R. Young; Cochran Freund & Young LLC

(57) ABSTRACT

An ambulatory mechanical leg system drives a mechanical leg (100, 21) with a crank (91) to pivot about a pivot axis (102) to produce uniform rectilinear motion at the distal end (41) of the leg (100, 21) during a stride stroke (51) portion of a crank revolution or cycle and then lifts the distal end (41) to fast-return it in a step stroke (61) during the remainder of the revolution to a starting point for the next stride stroke (51). The crank (91), leg (100, 21) and pivot axis (102) sizes and proportional lengths or distances are modeled to an angular profile that produces nearly constant velocity, and mechanical structures maintain nearly rectilinear motion, of the distal end (41) of the leg (100, 21) during the stride stroke (51).

30 Claims, 29 Drawing Sheets

APPARATUS AND METHOD FOR PRODUCING AMBULATORY MOTION

CROSS-REFERENCE TO RELATED APPLICATIONS

The present application claims priority to U.S. Provisional Application No. 60/394,057, filed Jul. 2, 2002 and to U.S. Provisional Patent Application No. 60/445,981 filed Feb. 7, 2003. Said Provisional Applications are incorporated herein by reference.

BACKGROUND OF THE INVENTION

1. Field of the Invention

This invention is related to systems that simulate ambulatory propulsion of objects on leg-like motive structures and, more specifically, to leg-like structures and associated drive systems that produce uniform rectilinear motion of such leg-like motive structures to propel objects in a stable and controllable manner over a support surface.

2. Brief Description of the Prior Art

There have been many attempts to make leg-like mechanical systems for propelling objects ranging from robotic vehicles to toy bugs, and some of them are capable of performing that function. However, problems persist in achieving stable devices with minimum complexity in the mechanical and control systems. For example, many of the prior art leg-like mechanical structures, especially non-articulated and simpler articulated leg-like mechanical structures, impart some amount of bobbing (up and down) motion and/or weaving (side to side) motion and/or surging (forward accelerating and decelerating) motion to the object they are propelling with each step. Some of such bobbing, weaving, and surging motion may be tolerable at low speeds and some can be minimized or even removed with more complex articulated mechanical leg structures that incorporate electronic or other independent articulation control features. However, for simpler, articulated and unarticulated mechanical leg structures, any one or all of such bobbing, weaving, and surging motions become impulses that can cause chattering, loss of traction, and loss of control, even to the extent of knocking the object off balance, off track, and/or off the floor, ground, or other supporting surface or even tipping it over. Such bobbing and weaving can also dissipate energy, thereby reducing efficiency, and inefficient slippage of the legs on the supporting surface is also a problem, especially for systems in which the leg-like structures move at varying speeds in relation to the object and support surface during a step cycle. It may be possible to mitigate these problems with complex and intricate control systems articulated leg structures, but simpler and less expensive solutions are preferable.

SUMMARY OF THE INVENTION

Accordingly, an object of the present invention is to provide relatively simple leg-like systems that can propel objects with ambulatory motion with good stability and control characteristics for any of a variety of objects; for example, but not for limitation, toys, robotic vehicles, amusement devices, transportation, weapons systems, etc.

Another object of this invention is to provide a mechanical system that produces cyclical uniform rectilinear motion of a point on a moveable structure in relation to an object.

Additional objects, advantages, and novel features of the invention are set forth in part in the description that follows and others will become apparent to those skilled in the art upon examination of the following description and figures or may be learned by practicing the invention. Further, the objects and the advantages of the invention may be realized and attained by the instrumentalities and in combinations particularly pointed out in the appended claims.

To achieve the foregoing and other objects in accordance with the purposes of the present invention, as embodied and broadly described herein, the locomotive apparatus and method includes a leg lever driven by a crank to pivot about a pivot axis which is positioned adjacent the crank, in a manner that causes a distal end of the leg lever, or of a leg strut extending from the leg lever, to move in a stride stroke path with uniform rectilinear motion in relation to a body being propelled by the locomotive apparatus and method, and then, at the end of the stride stroke path, to accelerate and return in an arcuate step stroke path to the beginning of a next rectilinear stride stroke path. The dimensions of the crank, leg lever to distal end, and crank axis to pivot are proportioned to model an angular profile of $Q=\text{ARCTAN}(VR/\omega d)$ to produce the uniform or constant velocity $V$ of the distal end or foot. The distal end or foot is constrained to move in the straight line (rectilinear motion) in any of several ways.

In one embodiment, the leg lever can be constrained in a manner that allows longitudinal, but not lateral, motion of the crank-driven leg lever in relation to the pivot. By tilting the crank drive apparatus in relation to the support surface, the distal end or foot in this example can be constrained to the uniform rectilinear motion in relation to the body during the stride stroke part of a crank cycle, when the distal end or foot is planted on the surface, but to then move the distal end or foot upwardly above the surface for the step stroke part of the crank cycle. During the step stroke, a plurality of other legs with their distal ends or feet planted on the support surface and moving in their respective stride strokes support the body.

In another embodiment, the leg lever can be constrained both longitudinally and laterally at the pivot, while it is constrained laterally, but allowed to move longitudinally, in relation to a crank pin that imparts pivotal motion to the leg lever. A passive strut constrains the distal end or foot to the rectilinear path of the stride stroke, and an active strut lifts the distal end or foot during the step stroke.

There are myriad variations of these embodiments of the locomotion apparatus and methods to produce uniform rectilinear motion for stride strokes followed by step strokes according to this invention.

There are also numerous combinations of multiple crank-driven legs, ganging, phase or sequence preferences, and the like for optimum balance, efficiencies, appearances, and other attributes, depending on desired applications of the invention.

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings:

DETAILED DESCRIPTION OF EXAMPLE PREFERRED EMBODIMENTS

Figure 1:
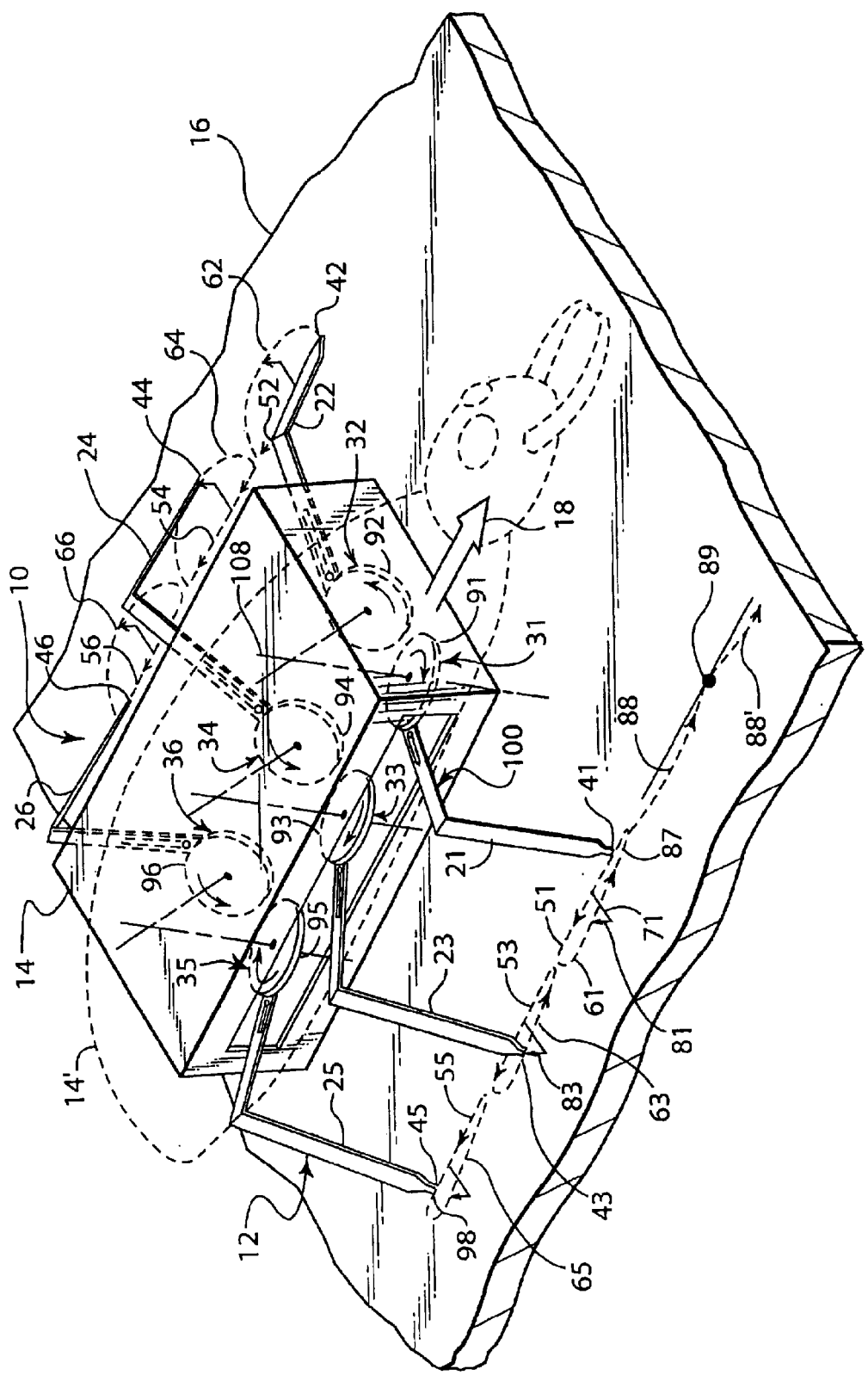
FIG. 1 is an isometric view of a motorized object equipped with an example mechanical ambulatory system for propelling the object according to this invention.

An object 10 equipped with an ambulatory leg propulsion system 12 is shown in FIG. 1 with a generic box-like body 14 for convenience, but with an example bug-like body 14' shown in phantom lines to illustrate the point that the object 10 can be provided with a body of any desired configuration or shape. The ambulatory leg system 12 will be shown and described in more detail below, but several salient features shown in FIG. 1 can provide an overview of at least one example embodiment of the invention as well as some of the concepts and principles that transcend all embodiments of the invention.

As shown in FIG. 1, the ambulatory leg propulsion system 12 can comprise six leg-like struts 21, 22, 23, 24, 25, 26 with respective associated drive mechanisms 31, 32, 33, 34, 35, 36 for a bug-like appearance, or it can comprise any other number of such leg struts and associated drive mechanisms that will propel the object 10 over a support surface 16 in a stable manner. The support surface 16 can be a floor, table, game board, ground, platform, or any of myriad other structures. In this embodiment of the object 10 shown in FIG. 1, the leg struts 21, 22, 23, 24, 25, 26 support the body 14 above, and propel it over, the surface 16. Such propulsion can be in a forward direction, as indicated by arrow 18, or it can be backward. The vehicle 10 can also be propelled to move at a constant speed or at varying speeds, which is not the same as undesirable, non-uniform, varying speeds of an individual leg strut in relation to crank speed, as will be explained in more detail below. The object 10 can also be turned or steered to one side or the other, for example, by operating the leg struts on one side of the body 14 faster than the other leg struts on the other side of the body 14 or with other steering or turning systems, as will be described in more detail below.

A significant feature of this invention is that at least some or all of the leg struts 21, 22, 23, 24, 25, 26 can be driven to move their respective distal ends or "feet" 41, 42, 43, 44, 45, 46 in uniform rectilinear motion during a stride stroke 51 and to lift their feet upwardly and off the support surface 16 in a step stroke to return for the beginning of subsequent stride strokes 51. To explain further, reference is made, for example, to the front right leg strut 21 in FIG. 1. To propel the object 10 over the surface 16 at a uniform, i.e., constant, velocity the leg strut 21 is driven so that its distal end or "foot" 41 moves in a cyclical pattern that includes a rectilinear, i.e., straight line, path 51, called the stride portion or stride stroke of the pattern. Then, at the end of the stride stroke 51, the foot 41 moves upwardly in relation to the body 14 and in relation to the surface 16 in a curved path 61, called the step portion or step stroke of the pattern, to return the foot 41 to the beginning of the rectilinear path 51 for another cycle. During the rectilinear path 51 movement, i.e., stride stroke, the foot 41 contacts the surface 16 and supports the object 10 as it propels the object 10 over the surface 16. Then, at the end of the stride stroke 51, while the object 10 is supported by other feet or other structures, the foot 41 raises above the surface 16 to move in the step stroke 61 back to the beginning of the rectilinear path 51.

In the example ambulatory leg system embodiment 12 shown in FIG. 1, the cyclic path of the foot 41, which is typical of the respective cyclic paths of the other feet 42, 43, 44, 45, 46, has its rectilinear path 51 of the stride stroke illustrated in phantom lines on the support surface 16. This view of the stride stroke 51 is accurate when viewing the path of the stride stroke 51 in relation to the body 14. Also, the step stroke 61 in the example embodiment of FIG. 1, when viewed in relation to the body 14, moves the foot 41 in the arcuate path of the step stroke 61, which extends outwardly 71 and upwardly 81 in relation to the body 14. However, because the body 14 is propelled forwardly, as indicated by the arrow 18, when the feet 41, 42, 43, 44, 45, 46 are driven in the respective stride strokes 51, 52, 53, 54, 55, 56, as shown in FIG. 1, the apparent depiction of the stride strokes 51, 52, 53, 54, 55, 56 as straight lines having lengths on the support surface 16 is not really accurate due to limitations inherent in illustrating an object in motion with a still drawing. In reality, when the foot 41 is planted at, for example, the spot 87 on the support surface 16 at the start of the stride stroke 51, it remains at that spot 87 on the support surface 16 throughout the stride stroke as the body 14 is propelled forward in relation to the support surface 16, just as a person's foot remains firmly planted in one spot on the floor as his or her leg propels him or her forward in a walking stride. Then, at the end of the stride stroke 51 of foot 41, the body 14 is continually propelled forwardly, as indicated by arrow 18, by several other ones of the leg struts 22, 23, 24, 25, 26, while the foot 41 is lifted above the surface 16 and stepped forward, as indicated by the dotted arcuate line 88, to be planted at another spot 89 on the surface 16 for the start of another stride stroke 51. Thus, the dotted arcuate lines 88, 88', in FIG. 1 depict more accurately the motion of the foot 41 in relation to the support surface 16, while the phantom lines 51, 61 depict the motion of the foot 41 in relation to the body 14.

Of course, as stated above, this description of the motion of the front right leg strut 21 and the foot 41 at its distal end is also typical of the motions of the other leg struts 22, 23, 24, 25, 26 and their respective feet 42, 43, 44, 45, 46, as the object 10 is propelled in the forward direction 18. Reversing the motions of the leg struts 21, 22, 23, 24, 25, 26 and their feet 41, 42, 43, 44, 45, 46 will, of course, propel the object 10 in the reverse direction, i.e., opposite the direction of arrow 18.

Also, as mentioned above, for stability, it is preferred that several of the feet 41, 42, 43, 44, 45, 46—at least two on one side of the body 14 and at least one on the other side of the body 14—be somewhere in their respective stride strokes at the same time so that at least three feet are supporting the object 10 on the surface 16 in a tripod (triangle) relationship to each other at any particular instant in time. Therefore, while each leg strut 21, 22, 23, 24, 25, 26 of the example embodiment shown in FIG. 1 is driven with its own respective crank-type drive mechanism 31, 32, 33, 34, 35, 36, as will be described in more detail below, some phase coordination among them is preferred for such stability purposes. For one example, as illustrated in FIG. 1, on the right side of the object 10, the right front foot 41 is planted at a spot 87 on the surface 16 and is just beginning its stride stroke 51 as the right rear foot 45 is also planted at a spot 98 on the surface 16, but nearing the end of its stride stroke 55. Meanwhile, the right center foot 43 is lifted above the surface 16 by a height 83 and is in its step stroke 63, returning toward a new stride stroke 53. By the time the right rear foot 45 reaches the end of its stride stroke 55 and is lifted off the surface 16 in its step stroke 65, the right center foot 43 will be planted on the surface 16 again and will be beginning its stride stroke 53. At the same time, the right front foot 41 will still be planted on the surface 16 and will be somewhere midway through its stride stroke 51. Then, by the time the right front foot 41 moves into its step stroke 61 above the surface 16, the right rear foot 45 will be back on the surface 16 beginning its next stride stroke 55, and the right center foot 43 will be on the surface 16 about mid-way through its stride stroke 53. The left feet 42, 44, 46 are shown phase-coordinated in a similar manner by their drive crank mechanisms 32, 34, 36, respectively. Therefore, the example, embodiment 10 shown in FIG. 1 has at least two right feet and two left feet on the surface 16 at any particular instant in time.

Another important, albeit not essential, feature of this invention, is that, unless the object 10 is accelerating or decelerating, the speed of the foot motion in relation to the body 14 while moving in the stride stroke is uniform, i.e., constant velocity. The terms "speed" and "velocity" are used interchangeably herein to mean the same thing, i.e., rate of movement without regard to vector directions or coordinate systems. Also, the stride stroke speeds of all the feet on the same side of the object 10 are the same, and, unless the object 10 is turning right or left, the stride stroke speeds of all the feet on both sides of the object 10 are the same. Such uniform (constant speed) rectilinear (straight-line) motion of the feet 41, 42, 43, 44, 45, 46, while they are in contact with the surface 16 in their respective stride strokes 51, 52, 53, 54, 55, 56, contributes significantly to the extraordinary stability of the object 10 when it is equipped with the ambulatory leg propulsion system 12 of this invention. For steering or turning the object 10 to the right, the stride stroke speed of the right side feet 41, 43, 45 can be slower than, or even stopped or reversed in relation to, the stride stroke speed of the left side feet 42, 44, 46. Conversely, to steer or turn the object 10 to the left, the stride stroke speed of the left side feet 42, 44, 46 can be slower than, or even stopped or reversed in relation to, the stride stroke speed of the right side feet 41, 43, 45.

This combination of having only feet in their uniform rectilinear stride strokes supporting and propelling the object 10 on the surface 16, while the feet in their step strokes are lifted off the surface 16, allows the body 14 to move smoothly in relation to the surface 16 without bobbing, weaving, or surging. This combination also avoids one foot working against another, which could cause dragging of feet, friction losses, and binding of drive parts. Therefore, fast speeds, accelerations, decelerations, and turning of the object 10 on the surface can be performed without tipping or loss of control. One or more of the feet on each side of the body 14, preferably the center feet 43, 45 on each respective side of the body 14, can be tipped with rubber or other non-slippery material for greater traction and to serve as pivot points for turning while the other feet are allowed some slippage during turning to prevent binding.

Another unique, convenient, and desirable, albeit not essential, feature of this invention is that the speed of the feet 41, 42, 43, 44, 45, 46 in their respective step strokes 61, 62, 63, 64, 65, 66 is faster than the speed of the feet 41, 42, 43, 44, 45, 46 in their respective stride strokes 51, 52, 53, 54, 55, 56. In other words, while the speed of, for example, the foot 41 in its stride stroke 51 is uniform or constant throughout the length of the stride stroke path 51, it accelerates to a faster speed in its step stroke path 61 and then decelerates to the stride stroke speed as it nears and reaches the beginning of the next stride stroke 51. This feature also contributes to the stability and versatility of an object 10 equipped with the ambulatory leg propulsion system 12 of this invention by making it possible and even easy to keep at least three, and preferably four, of the six feet 41, 42, 43, 44, 45, 46 planted on the support surface 16 at any instant in time.

In a preferred example implementation of this invention, each leg strut 41, 42, 43, 44, 45, 46 is driven by a respective crank 91, 92, 93, 94, 95, 96, which is a part of the respective drive mechanism 31, 32, 33, 34, 35, 36 that can rotate at either a constant angular velocity for propelling the object 10 at a constant speed or variable angular velocities for acceleration or deceleration of the object 10 in relation to the surface 16 or for steering, as explained above. The speed of a foot 41, 42, 43, 44, 45, 46 in its respective rectilinear stride stroke 51, 52, 53, 54, 55, 56 is directly proportional to the angular velocity of the crank wheel 91, 92, 93, 94, 95, 96 of its respective drive mechanism 31, 32, 33, 34, 35, 36, as will be described in more detail below. Therefore, accelerating or decelerating the angular velocity of the crank wheels 91, 92, 93, 94, 95, 96 in crank mechanisms 31, 32, 33, 34, 35, 36 will cause a proportional acceleration or deceleration of the object 10 in relation to the surface 16.

In a preferred example implementation of the ambulatory leg propulsion system 12 shown in FIG. 1, the stride strokes 51, 52, 53, 54, 55, 56 of the foot motion cycle use more than half, preferably about two-thirds, of a respective crank 91, 92, 93, 94, 95, 96 rotation, as will be described in more detail below. Therefore, the step strokes 61, 62, 63, 64, 65, 66 of the foot motion cycle use less than half, preferably about one-third, of the respective crank 91, 92, 93, 94, 95, 96 rotations. This preferred example implementation is ideal for the kind of stride/step cycle phase sequencing and coordination with a gang of three leg struts per side, as described above, so that there are always at least two of the three feet on each side of the object 10 in stride stroke as the third foot is in step stroke. To implement this arrangement, the three right side crank mechanisms 91, 93, 95 are set and operated 120 degrees out of phase with respect to each other, and the three left side crank mechanisms 92, 94, 96 are set and operated 120 degrees out of phase with each other. There is a caveat, however, in regard to such phase settings in legs that are ganged together, because some phase settings can cause one or more leg positions somewhere in a crank cycle that do not provide stable support for the object 10. For example, in a gang of three crank mechanisms that are set 120 degrees out of phase with each other, but in the wrong angular direction, there is an angular position in which the three feet, e.g., feet 41, 43, 45 or feet 42, 44, 46, in the gang are all planted close together enough to each other to cause an unstable condition for the object 10. The same phasing at another part of the crank cycle causes an end leg to lift into a step stride, while the other end leg and middle leg do not straddle, i.e., are on the same side of, the center of gravity of the object 10, which is also unstable support for the object. Specifically, this example undesirable instability condition can occur when each crank drive that is positioned rearwardly from an adjacent crank mechanism is retarded in a range of about 105 degrees to 135 degrees, and especially by about 120 degrees, with respect to such adjacent crank drive, as will be described in more detail below. With care to avoid this and other undesirable retarded phase relationships in the crank mechanisms, other cycle phase sequences can also be used with the six-leg embodiment 10 of FIG. 1 and still have good stability. The desirable phase relationship that provides two-thirds crank rotation for stride strokes and one-third crank rotation for step strokes also makes it possible to have a stable 4-legged object, as will be explained in more detail below. Of course, this invention includes, and can function using, less than half of a crank rotation for the respective stride strokes 51, 52, 53, 54, 55, 56, even as little as five degrees of rotation, but this kind of arrangement or implementation would require more crank and leg assemblies to maintain stability. In general, the fewer the degrees of crank rotation used in the stride stroke, the more crank and leg assemblies will be needed for stability of the object 10.

Turning now to the crank mechanisms 91, 92, 93, 94, 95, 96, which are used to produce the uniform rectilinear motion for the stride strokes 51, 52, 53, 54, 55, 56 of the feet 41, 42, 43, 44, 45, 46, all of the drive mechanisms 31, 32, 33, 34, 35, 36 are essentially the same. Therefore, only one of these crank mechanisms, e.g., the right front crank mechanism 31, will be described in detail, but with the understanding that it is typical of the other crank mechanisms 32, 33, 34, 35, 36 as well.

Figure 2:
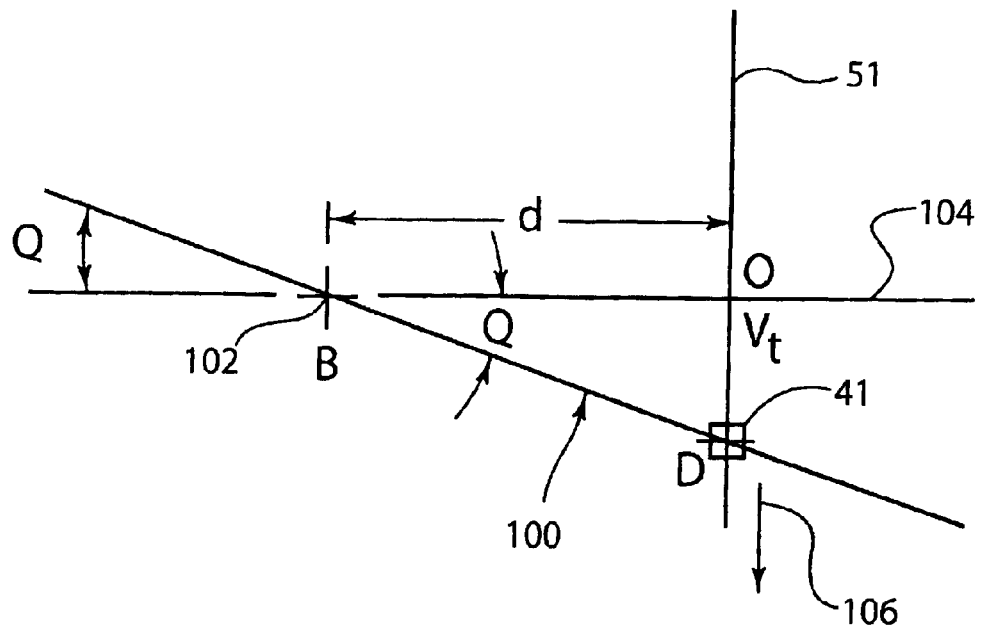
FIG. 2 is a lever diagram used to explain the angular profile needed to achieve the uniform rectilinear motion of mechanical legs and feet according to this invention.

The principle geometry utilized by the ambulatory leg propulsion systems of this invention, including the ambulatory leg propulsion system 12 of FIG. 1, is illustrated in FIG. 2. The function of the drive mechanism is to move a foot 41 at a point D on a leg lever 100 in a rectilinear path 51 as the leg lever 100 pivots about a fixed pivot axis 102, which extends through the leg lever 100 at a point B. The leg lever 100 forms an angle Q with a line 104, which is perpendicular to the rectilinear (straight-line) path 51 of the foot 41 in its stride stroke. As the leg lever 100 pivots about the fixed axis 102 to move the foot 41 along the rectilinear path 51, the angle Q changes.

In order for the foot 41 to move at a constant speed or velocity V along the rectilinear path 51, as indicated by arrow 106, it is necessary for the angle Q to change at something other than a constant rate. The distance moved by the foot 41, thus its position, at any time t along the rectilinear path 51 is V×t, or Vt. The distance d between points B and O on the perpendicular line 104 does not change. Therefore, the mathematical relationship between the distance Vt, the distance d, and the angle Q is:

$$\text{TAN}(Q) = \frac{Vt}{d}, \quad (1)$$

and the angle Q at any point in time t is given by:

$$Q = \text{ARCTAN}\left(\frac{Vt}{d}\right). \quad (2)$$

This relationship of Equation (2) is a general result that applies to any mechanism using a fixed pivot axis 102 to swing a leg lever 100 in a manner that can move a point or points on the leg lever 100 or a projection thereof at a constant speed or velocity V along a straight-line path 51. Consequently, regardless of the technique used to maintain a foot 41 moving at a constant linear velocity V along a straight-line path 51, the angle Q must follow this angle change profile according to equation (2).

Figure 3:
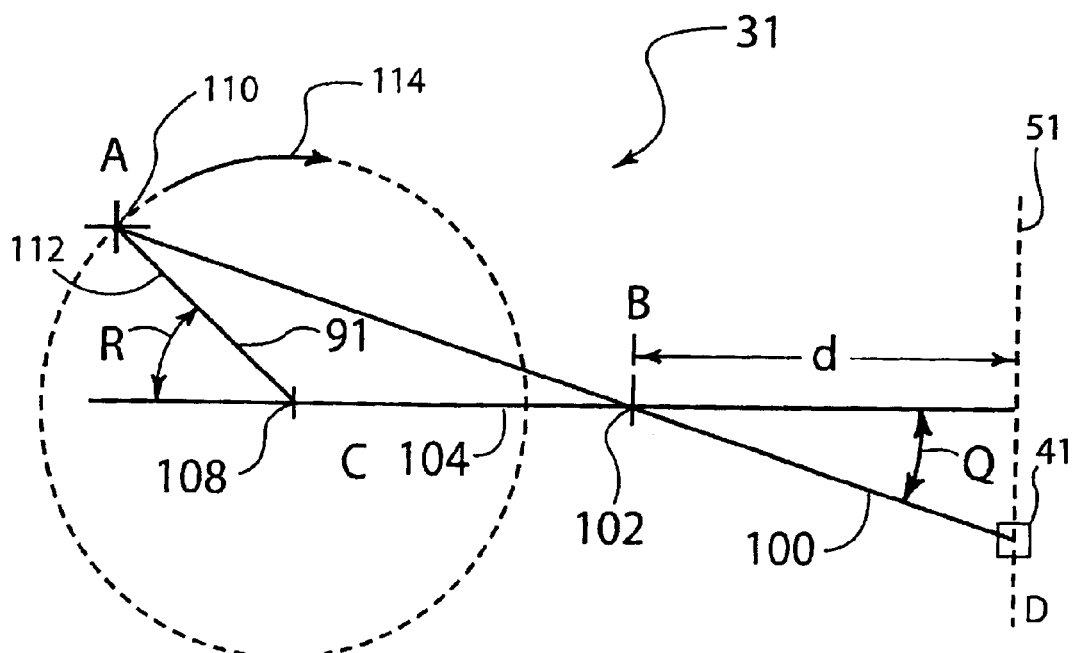
FIG. 3 is a lever diagram similar to FIG. 2 that includes a crank system for achieving the rectilinear motion according to this invention.

A schematic of a drive mechanism 31 that is capable of swinging a leg lever 100 in a manner that approximates very closely the angle change profile of Equation (2) is shown in FIG. 3, ignoring for the moment exactly how the foot 41 at point D on the leg lever 100 is made to follow the rectilinear path 51. In this crank mechanism 31, an approximation of the angular profile of Equation (2) arises from the leg lever 100 pivoting about the axis 102, which extends through point B, and being driven by a crank 91. The crank 91, which can be a lever, wheel, or other structure, rotates about an axis 108 extending through a point C, and it is rotatably connected to the leg lever 100 by a connecting crank pin 110. The crank pin 110 has an axis that extends through a point A on the leg lever 100. The crank pin 110, thus also point A on the leg lever 100, rotates around the crank axis 108 at a radius equal to the distance between points C and A, i.e., at a radial distance of CA. The crank axis 108 is fixed at an unchanging position with respect to the pivot axis 102, so the distance AB between the crank pin 112 and the pivot axis 102 varies as the crank pin 110 rotates about the crank axis 108. Consequently, the distance AB varies as a function of the angle R between the crank arm 112, which extends between the crank axis 108 and the crank pin 110, and the line 104, which is perpendicular to the rectilinear path 51. Since the distance AB varies as the pin 110 rotates about the crank axis 108, and since the axis 102 is fixed, something has to accommodate longitudinal motion of the leg lever 100 with respect to the fixed axis 102, while not allowing lateral movement of the leg lever 100 with respect to the fixed axis 102. Such accommodation can be made in myriad ways, for example, by a slotted hole (not shown in FIG. 3) or other longitudinally slideable guide, as will be described in more detail below. The motion generated by the geometry of this crank and lever drive system 31 as the crank arm 112 rotates, as indicated by arrow 114, about the crank axis 108 can be characterized by two parameters, i.e., the radius CA of the crank and the distance CB from the crank axis 108 to the pivot axis 102.

It is appropriate to note here that the rectilinear path 51 can be anywhere in a stride plane that is parallel to the pivot axis 102, perpendicular to the line BO, and extending through the distal end or foot 41, which may or may not be in the same plane as the crank 91. In fact, as will be shown below, the distal end or foot 41 is usually extended below the plane of the crank 91 (first plane) to another plane (second plane) below the first plane so that it supports the crank 91 and other parts of the object 10 above the support surface 16.

As explained above, it is desired that the angle Q in the drive system 31 of FIG. 3 follow the angle profile of Equation (2) as the crank angle R advances at a constant angular velocity ω, so that a foot 41 on the leg lever 100 moves along the rectilinear path 51 at a uniform velocity V, as explained above. As the crank pin 110 rotates at a constant angular velocity ω, $$R = \omega t. \quad (3)$$

The relationship between the crank angle R and the leg lever angle Q can be shown, but it is easier to do so by expressing the time t as a function of R from Equation (3), i.e., $$t = \frac{R}{\omega}, \quad (4)$$

so that substituting R/ω for t in equation (2) yields $$Q = \text{ARCTAN}\left(\frac{VR}{\omega d}\right). \quad (5)$$

In other words, to make a foot 41 at point D on the leg lever 100 move along rectilinear path 51 at a constant linear velocity V, given a crank pin 110 rotating at a constant angular velocity ω, the leg lever angle Q must be related to the crank angle R as shown by Equation (5).

With a varied set of values or parameters (lengths) for the crank radius CA and for the distance CB from the crank axis 108 to the pivot axis 102, the conceptual drive mechanism 31 of FIG. 3 will generate a family of curves relating the leg lever angle Q to the crank angle R. One such set of parameters for the crank radius CA and for the distance CB found by numerical optimization, specifically where the ratio of distance CB to CA is 1.53708, enables the drive mechanism 31 to generate a very close approximation to the desired leg lever angle Q and crank angle R relation of Equations (2) and (5). Therefore, when the ratio is $$\left|\frac{CB}{CA}\right| = 1.53708, \qquad (6)$$

the conceptual crank drive mechanism 31 of FIG. 3 will move the foot 41 along the rectilinear path 51 at a uniform (constant) linear velocity V as the crank pin 110 rotates at a constant angular velocity ω through at least part of a full 360-degree revolution of the crank pin 110 about crank axis 108.

Figure 4:
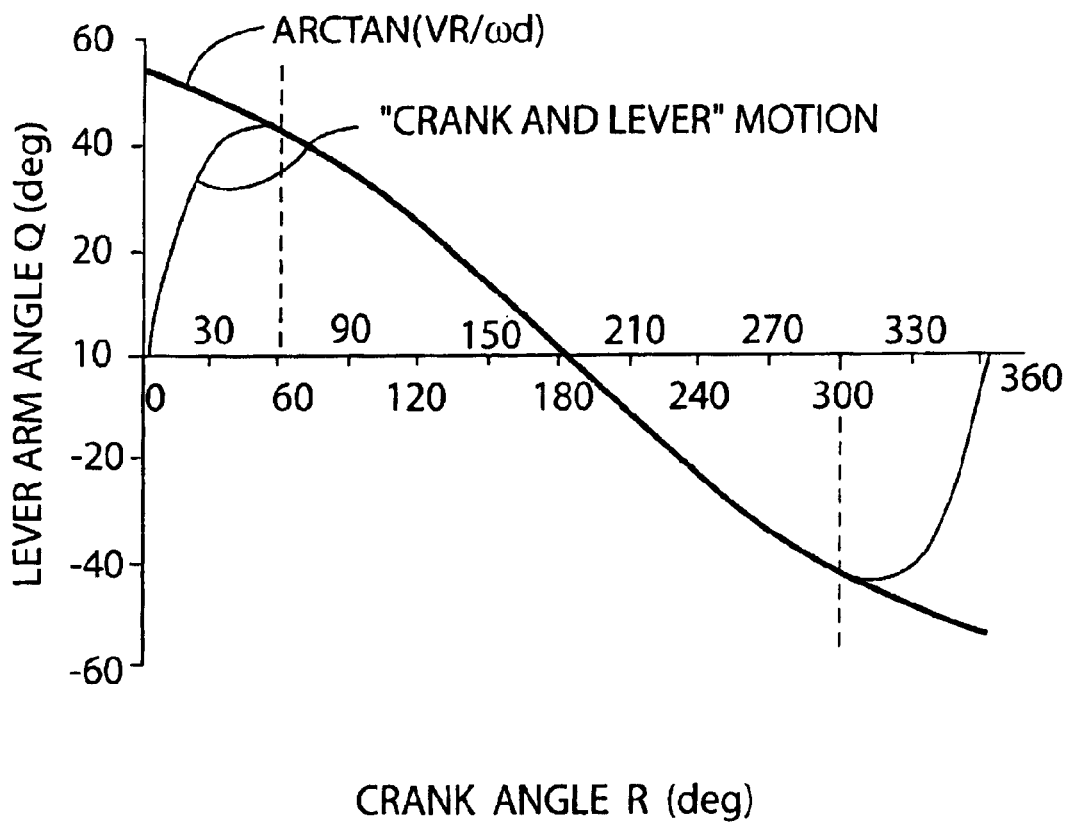
FIG. 4 is an angular profile generated by the lever and crank mechanism diagramed in FIG. 3 overlayed by the desired angular function for uniform rectilinear motion according to this invention.

The resulting curve relating the angles Q and R, when the crank radius CA and the distance CB have the ratio of Equation (6), is shown in FIG. 4 plotted against the exact function of Equation (2) for comparison. As can be seen in FIG. 4, this technique, i.e., this kind of crank drive system 31 with the ratio of Equation (6), provides an excellent approximation of an actual Q and R angular profile to the desired angular profile of Equation (5). This uniform rectilinear motion of a foot 41 continues for about 240 degrees of crank pin 110 rotation about the crank axis 108.

Specifically, as shown in FIG. 4, between about 60 degrees and 300 degrees of crank rotation, i.e., crank angle R, the "crank and lever" angle relationship curve fits very closely to the ideal angle relationship ARCTAN (VR/ωd) of Equation (5).

During the remaining 120 degrees of rotation of the crank pin 110 about the crank axis 108, i.e., from 0 to 60 degrees and from 300 to 360 degrees, where the ends of the "crank and lever" curve in FIG. 4 do not conform to the angle profile or relationship of Equation (5), the crank drive mechanism of this invention returns the foot 41 rapidly in an arcuate path 61 (not shown in FIG. 3, but shown in FIG. 1) to a beginning point on the rectilinear path 51.

Such a crank drive mechanism 31, as shown in FIG. 3 and described above, is well-suited for use in creating the ambulatory leg motion according to this invention, because of its ability to closely approximate the angle relationship and profile of Equation (5) for uniform rectilinear motion of the foot 41 for a substantial portion of the crank pin 110 rotation about the crank axis 108 and because of the rapid return of the foot 41 to a starting point, as described above. The ability of the foot 41 to remain in the rectilinear path 51 for the greater part of the crank pin 110 rotation provides the benefits of a longer rectilinear path 51 and allows the foot 41 to stay engaged with the support surface 16 (FIG. 1) longer, which, in turn, allows for greater stability and traction with fewer legs. Also, the rapid foot 41 return by a smaller portion of the crank pin 110 rotation about crank axis 108 reduces instability and opportunities for the object 10 (FIG. 1) to tip. As mentioned above, these parameters and benefits can be optimized by providing the dimension ratio of Equation (6). However, other design considerations or constraints may result in different optimum ratios without departing from this invention.

Figure 5:
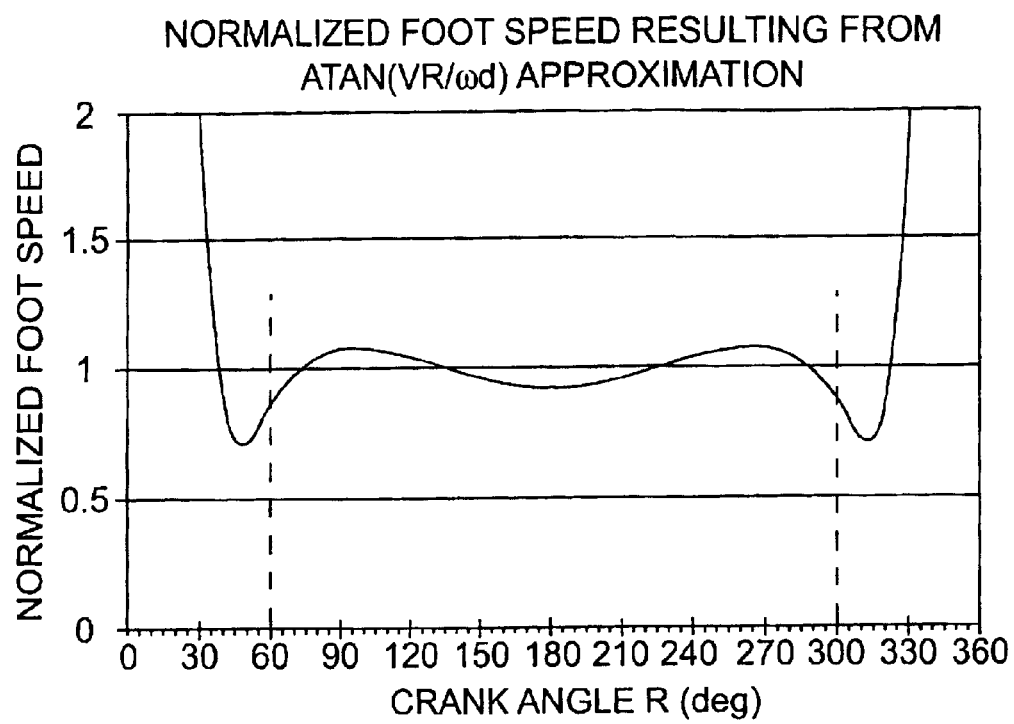
FIG. 5 is a graph showing normalized foot speed versus crank angle that is achievable with the lever and crank mechanism of this invention.

A foot 41 driven by the crank mechanism 31 with dimensions at or near the ratio of Equation (6) as described above, will move at a very nearly constant velocity V when it is made to follow a straight-line path 51, as shown in FIG. 3. The graph in FIG. 5 illustrates the normalized speed of a foot 41 driven by the crank mechanism 31, again in the rectilinear motion zone when the crank angle R is between about 60 degrees and 300 degrees. Again, as mentioned above, this invention can be practiced with the rectilinear motion occurring during smaller angular intervals, but such a system would require more legs for stability. As illustrated in FIG. 5, such speed is nearly constant—varying by less than seven percent (7%) over and under the norm of 1. In practicing this invention, such speed variations of less than thirty percent (30%) over or under the norm is preferred, although 10–20% is more preferred, and less than 10% is most preferred.

One example of a crank drive mechanism 31, which moves a foot 41 positioned at point D on a leg lever 100 in substantially uniform rectilinear motion in a path 51, as explained above, is shown in FIG. 6. In this crank mechanism 31, a crank wheel 91 rotates about a crank axis 108, while a crank pin 110 positioned on the crank wheel 91 at a radial distance CA from the crank axis 108, rotates about the crank axis 108. The proximal end 116 of the leg lever 100 is rotatably connected to the crank pin 110, while a pivot pin 120 at the pivot axis 102 extends through a slotted hole 122 in the leg lever 100. The combination of the pivot pin 120 and the slotted hole 122 functions to constrain the leg lever 100 against lateral movement in relation to the pivot axis 102 while allowing longitudinal motion of the leg lever 100 in relation to the pivot axis 102. The slotted hole 122 has to be at least as long as double the radial distance CA in order to accommodate the maximum change in the distance AB as the crank pin 110 rotates around the crank axis 108. Therefore, as the crank pin 110 rotates about the crank axis 108, the leg lever 100 both pivots on, and slides longitudinally back and forth in relation to, the pivot pin 120. Consequently, with appropriate proportioning of the radial distance CA to the distance CB, as described above, the leg lever 100 will move a foot 41 at its distal end 118 at a uniform velocity V along a rectilinear path 51 while the crank pin 110 rotates through a substantial angle about the crank axis 108. As mentioned above, this invention works with such rectilinear motion as the crank pin 110 rotates through even small angles. However, the smaller such angular rotation of the crank pin 110 during which the foot 41 is confined to rectilinear motion, the more legs 100 that will be required for stable support and propulsion of the object 10. Therefore, it is preferable that such rectilinear motion of the foot 41 is maintained through more than 90 degrees of crank pin 110 rotation about crank axis 108, more preferable for more than 180 degrees, and most preferably about 240 degrees. Then, by choosing an appropriate length for the leg lever 100, i.e., an appropriate distance AD (perpendicular from the axis of the crank pin 110 to the foot 41 at point D), the foot 41 will move at such uniform speed in a rectilinear path 51, as illustrated in FIG. 7. In FIG. 7, the preferred ratio of CB to CA of Equation (6) is shown schematically with an appropriate length AD to make a foot 41 at point D move in uniform rectilinear motion. To illustrate, a series of random points A are selected on the circular crank path 122 swept out by the crank pin 110 as it rotates about the crank axis 108. A series of rays representing the various positions and orientations of the leg lever 100 extend from the points A through the pivot axis 102 at point B to the position of the foot 41 at point D on each of such rays. Again, the distance AD is unchanged, thus the same on each ray. As can be seen in FIG. 7, this crank mechanism 31, with the appropriate proportions and lengths, the foot 41 at point D traces the rectilinear path 51 in the direction of the arrows 124 as the crank pin 110 rotates in the angular direction of arrow 122. Of course, rotation of the crank pin 110 in the opposite direction would cause the foot 41 to move in the opposite direction.

Figure 8:
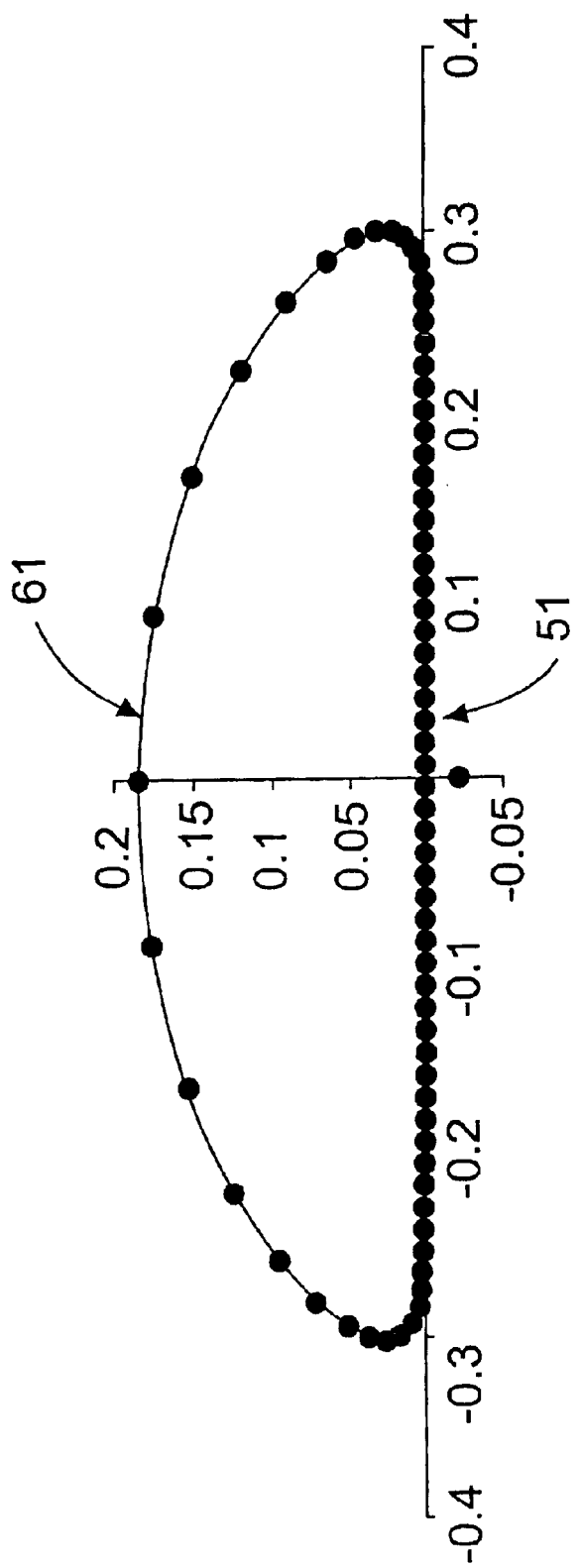
FIG. 8 is a more detailed and precise graphical representation of the path of FIG. 7, but with the dots and distances between the dots indicating relative linear speed of the foot portion of the lever during constant angular rotation of the crank according to this invention.

Consequently, the crank mechanism 31 is characterized by three lengths: (1) The crank radius CA; (2) The distance CB from the crank axis 108 to the pivot axis 102; and (3) The length AD of the leg lever 100 from the pivot pin 110 to the foot 41. Only a small range of ratios of CB to CA provide an angular relationship, i.e., angular profile Q=ARCTAN (VR/ωd) of Formula (5), that will produce constant speed of the foot 41, as explained above. In other words, small variations in the CB to CA ratio will cause the nearly ideal relation of Equation (5) to deteriorate, even though this invention still works quite well with a significantly wider range of the CB to CA ratio, i.e., with something less than the ideal. For example, a reasonably useable ambulatory device made according to this invention, i.e., without too much bobbing, weaving, and/or surging, can have a CB/CA ratio anywhere in a range of about 1.5 to 2.6 and an AD/CA ratio in a range of about 3 to 12. However, when trying to remain as close to the ideal relationship of Equation (5) as possible for constant speed of the foot 41, the CB/CA ratio should be kept within a small range, and the length AD is practically the only parameter that can be adjusted to obtain the straight-line path 51. Such adjustment or setting of the length AD is easily done empirically or, if preferred, mathematically, such as by numerical optimization. To some extent, a compromise may have to be made among all three of these parameters to achieve an optimum combination for as close to both straight-line motion and constant speed as possible. An example of such an optimized foot path profile 51, 61 obtained by numerical optimization is shown in FIG. 8. Each point in the profile 51, 61 of FIG. 8 represents a 5-degree advance of the crank pin 110 around the crank axis 108. The uniformly spaced points along the straight path 51 indicate the extent to which the desired uniform (constant speed) rectilinear (straight-line) motion is achieved, while the varying and longer spacing between the points in the curved return path 61 indicate the much accelerated and then decelerated nonlinear motion of the foot 41 in the return path 61.

The numerical optimization used to derive the point profile in FIG. 8 was based on the error between perfect rectilinear motion at uniform velocity and the actual foot motion obtained. A function of the error was integrated over the desired range of 240 degrees of crank rotation. In this example, the error function used was the square of the difference in position of the actual foot in relation to an ideal position of a foot that could execute ideal uniform rectilinear motion. The result of this integration was minimized based on the variation of the following two ratios: (1) The ratio of the distance CB from the crank axis 108 to the pivot axis 102 and the crank radius CA, i.e., |CB| to |CA|; and (2) The ratio of the leg lever 100 length AD to the crank radius CA, i.e., |AD| to |CA|. The specific ratios obtained in this example were |CB|/|CA|=1.53708 and |AD|/|CA|=6.319105. These ratios are the preferred ratios for the specific error function used. However, variations in the design goals (error function) make only small changes in these ratios.

Figure 9:
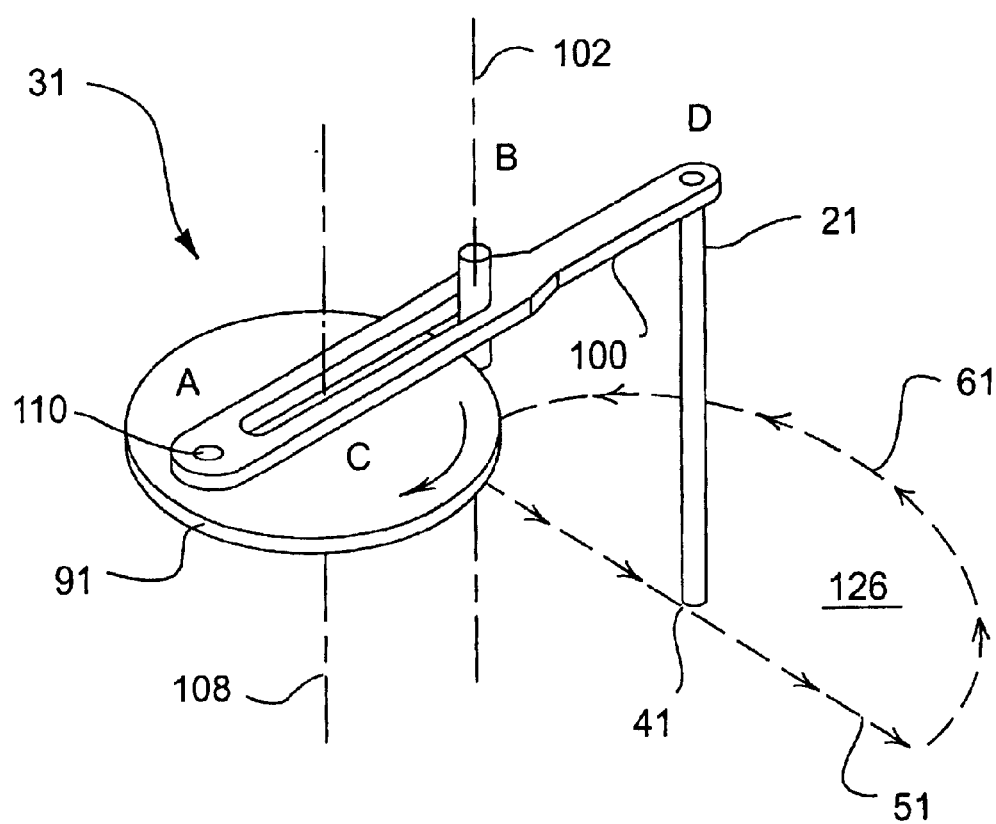
FIG. 9 is a diagram of the planar crank and lever diagram and/or mechanisms of FIGS. 3, 6, and 7, but also including a vertical extension of the lever out of the horizontal plane of the crank in a manner that is useful for constructing use as bug-like legs similar to FIG. 1.

The motion and resulting paths 51, 61 scribed or traced by the foot 41 at point D are in a first plane perpendicular to the crank axis 108, and the distance AD is in a line perpendicular to the crank axis. Therefore, a lower leg strut 21 extending upwardly or downwardly from the leg lever 100 can be used to scribe the paths 51, 61 in another plane that is parallel to the first one. For example, as shown in FIG. 9, a lower leg strut 21 extending downwardly from the leg lever 100 positions the foot 41, thus the paths 51, 61, in a second plane 126 that is lower than the leg lever 100, but still—like the first plane—perpendicular to the crank axis 108. This feature is used in the example object 10 in FIG. 1 to position the feet 41, 42, 43, 44, 45, 46 below the body 14 in order to hold the body 14 above the support surface 16. As explained above, the stride path 51, thus the foot 41 while in the stride stroke, is also in the stride plane, which is parallel to the pivot axis 102 and perpendicular to line CB and the first plane.

Figure 10:
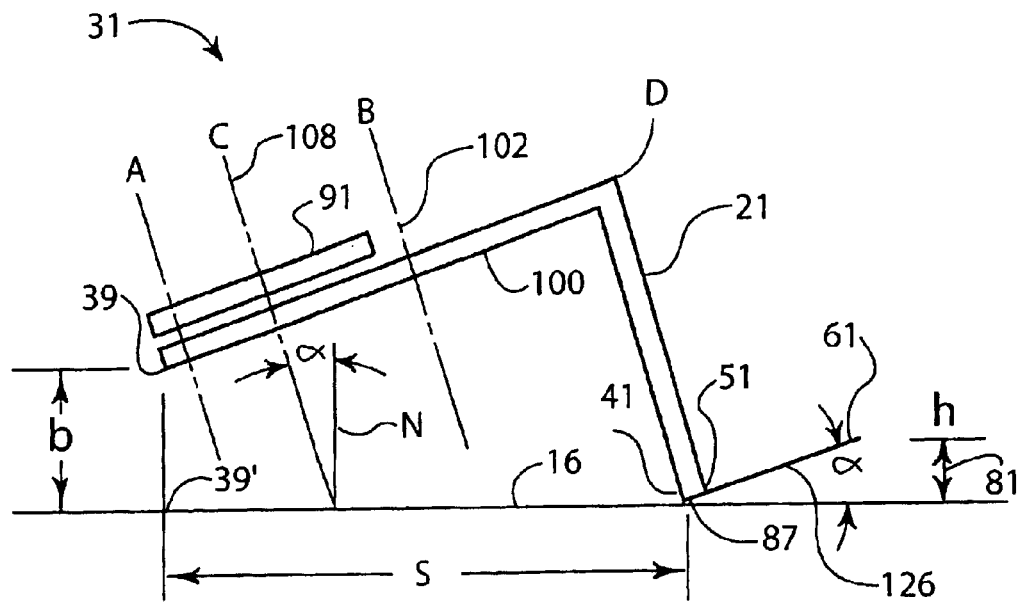
FIG. 10 illustrates how tilting the crank and lever system of FIG. 9 can be used to drive the foot of the crank and lever mechanism so that the rectilinear portion is on the ground or other support surface and the arcuate portion is lifted above the ground or other support surface.

To form a practical ambulatory leg propulsion system, the foot 41 should be in contact with the support surface 16 during the stride or power stroke 51 that propels the object 10, as shown in FIG. 1, but it should be lifted above the surface 16 during the step or return stroke 61. The crank drive mechanism 31 shown in FIGS. 1 and 9 can be made to move the foot 41 in this manner by tipping the drive mechanism 31 to incline the crank axis 108 with respect to a normal (perpendicular) N of the support surface 16, as illustrated in FIG. 10. Since the path 51, 61 (FIG. 9) scribed or traced by the foot 41 lays in a plane 126 that is perpendicular to the crank axis 108, when the crank axis 108 is tilted by an angle α with respect to the normal N of the plane of the surface 16, the plane 126 of the foot paths 51, 61 will also be inclined with respect to the support surface 16 by the angle α. Therefore, if the crank drive mechanism is positioned at the proper height above the surface 16 to position straight-line portion 51 of the foot path in the inclined plane 126, then the remaining arcuate portion 61 of the foot path will rise above the support surface 16 by a height 81 before returning to the start of the straight-line portion 51 of the foot path. Therefore, tilting the crank drive mechanism 31 with respect to the surface 16, as described above, provides a simple, yet elegant way to lift the foot 41 off the surface 16 during its return or step stroke 61. There are also other ways to lift the foot 41 above the surface 16 during the step stroke, as will be addressed in more detail below, so this invention is not limited to this one technique of tilting the crank drive mechanism 31 with respect to the support surface 16.

The direction of the angle α is such that the support surface 16 and the plane 126 in which the movement of the foot 41 in the paths 51, 61 occur intersect along the same line as the straight-line path 51 of the rectilinear motion of the foot 41. Since the drive mechanism 31 must allow a certain clearance b from the support surface 16, as shown in FIG. 10, any arbitrary angle α between 0 and ARCTAN (s/b) can be used, where s, as shown in FIG. 10, is the distance on the support surface 16 between a point 39' on the support surface 16 directly under the lowest point 39 of the drive mechanism 16 and the point 87 where the foot 41 touches the support surface 16. For a particular chosen angle α and clearance b, the dimensions of the drive mechanism 31 must be scaled and the length of the perpendicular extension leg strut 21 chosen such that the foot 41 plants at a distance s. However, if the angle α is too great, the drive mechanism 31 must be scaled down, compromising the length of the stride stroke 51 and step stroke height 81. If the angle α is too small, the stride stroke 51 is greater, but the step stroke height 81 is compromised due to the shallow angle α resulting from a small angle α. Between these two extremes, there is some optimum angle α for which the step stroke height 81 is greatest. Such optimum angle α can be found either numerically or analytically. The analytical method can be used as follows to determine an appropriate angle α:

$$\alpha = \mathrm{ARCCOS}\left(\frac{J}{K}\right), \tag{7}$$

where:

$$L = \frac{b}{s}, \tag{8}$$

$$J = \frac{LK}{\sqrt{L^2 + (1-K)^2}}, \text{ and} \tag{9}$$

$$K = 1 + L^2 - L\sqrt{1+L^2}. \tag{10}$$

Figure 6:
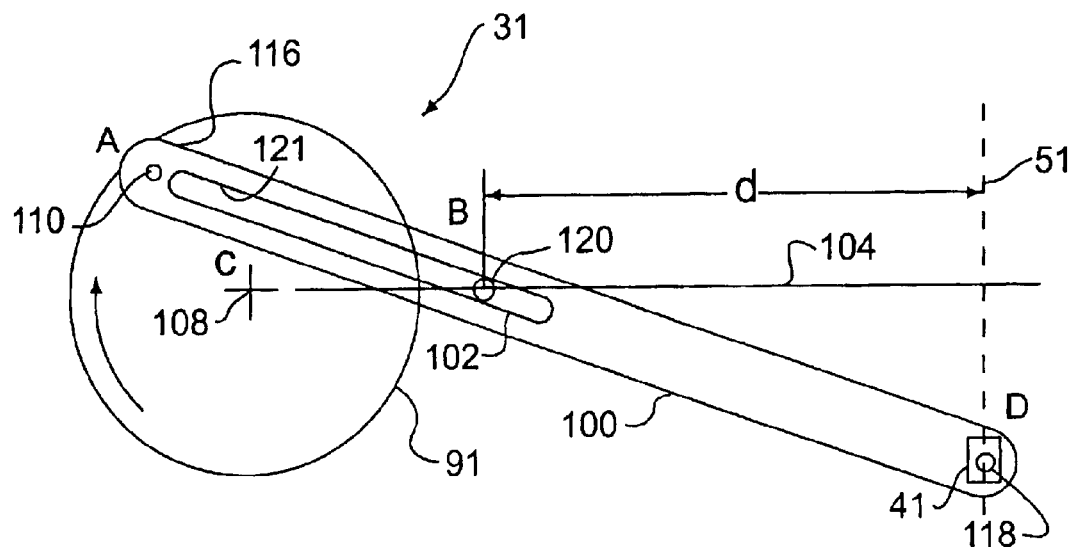
FIG. 6 is a diagrammatic view of an example crank and lever mechanism that can be used to achieve the uniform rectilinear motion according to this invention.
Figure 7:
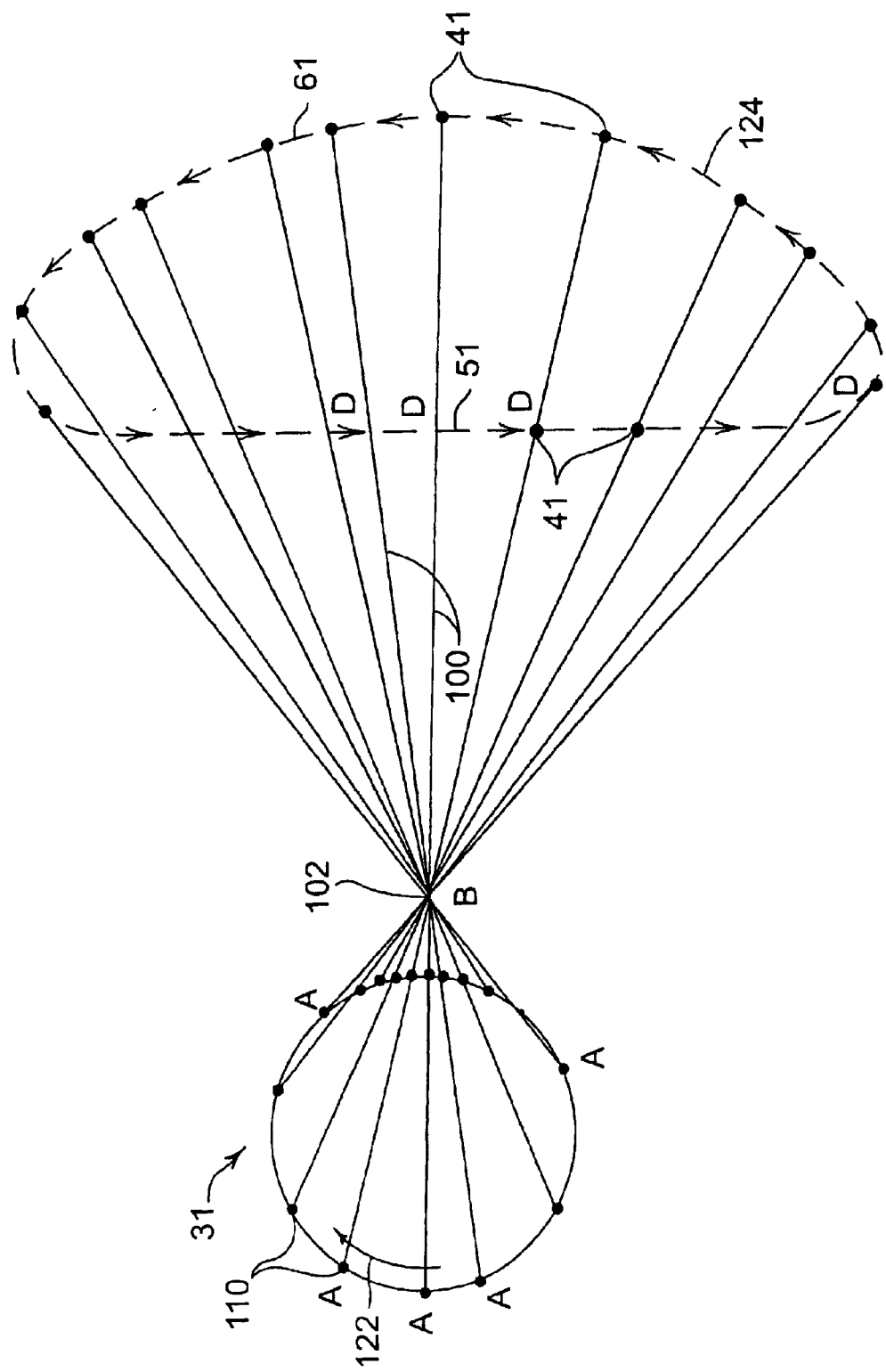
FIG. 7 is a diagram illustrating the rectilinear and arcuate portions of a path traced by the crank and lever mechanism of FIG. 6 through various angles of crank rotation.

For example, an embodiment designed into a six-legged, bug-shaped object, such as the object 10 in FIG. 1, can use the following ratios as design parameters, with reference to FIGS. 6 and 10:

$$\frac{b}{|CA|} = 4.0387 \tag{11}$$

and $$\frac{s}{|CA|} = 9.4236. \tag{12}$$

In this example, the optimum dihedral angle α between the support surface 16 and the plane 126 of the foot paths 51, 61 should be about 33.4 degrees for optimum step stroke height 81. This relatively shallow angle α simultaneously allows for a fairly large stride stroke 51.

Figure 11:
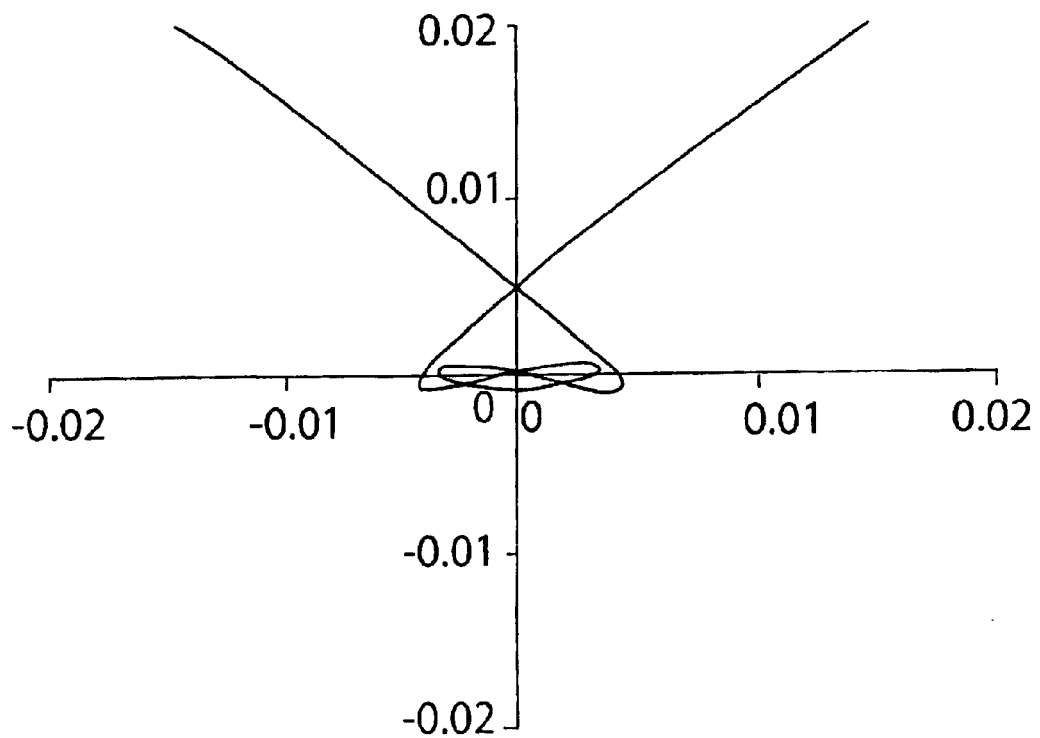
FIG. 11 illustrates how the shape of the leg lever of FIG. 10 can be modified and still provide the desired rectilinear and arcuate motions of the foot at the distal end of the leg lever according to this invention.

In consideration of the compromise between linearity of the stride stroke 51 and constant velocity V of the foot 41 in the stride stroke 51, and further with the stepping in the tilted plane 126, as described above, the resulting performance of this example implementation of the drive mechanism 31 is shown in FIG. 11. This graph in FIG. 11 depicts how the foot 41 would appear to an observer on the surface 16 as the example of object 10 moves by. Ideally, the foot 41 would plant in front of the observer at 0, 0 on FIG. 11, which corresponds to point 87 in FIG. 1, and then lift and move off the surface 16 to plant at the next point 89 in FIG. 1. During the time of the stride or power stroke 51, the foot 41 would ideally remain at the reference point 87 in FIG. 1 (0, 0 in FIG. 11). However, given the approximations made in the numerical determinations for this example, there is actually some small amount of foot 41 motion with respect to the point 87 (0, 0) on support surface 16 while the foot 41 is in contact with the support surface 16. The data for the example graph in FIG. 11 are based on a b=0.375 inch and s=0.875 inch. The optimum height b, and the forward advance of the entire object 10 (not just one leg stride) is about 0.81 inch per crank pin 110 revolution. For the CB/CA=1.53708 and AD/CA=6.319105 ratio of the example described above, the deviation from straight line is on the order of +/−0.0013 inch, and the deviation due to non-uniform velocity V is +/−0.0019 inch, which is insignificant for performance purposes.

Figure 12:
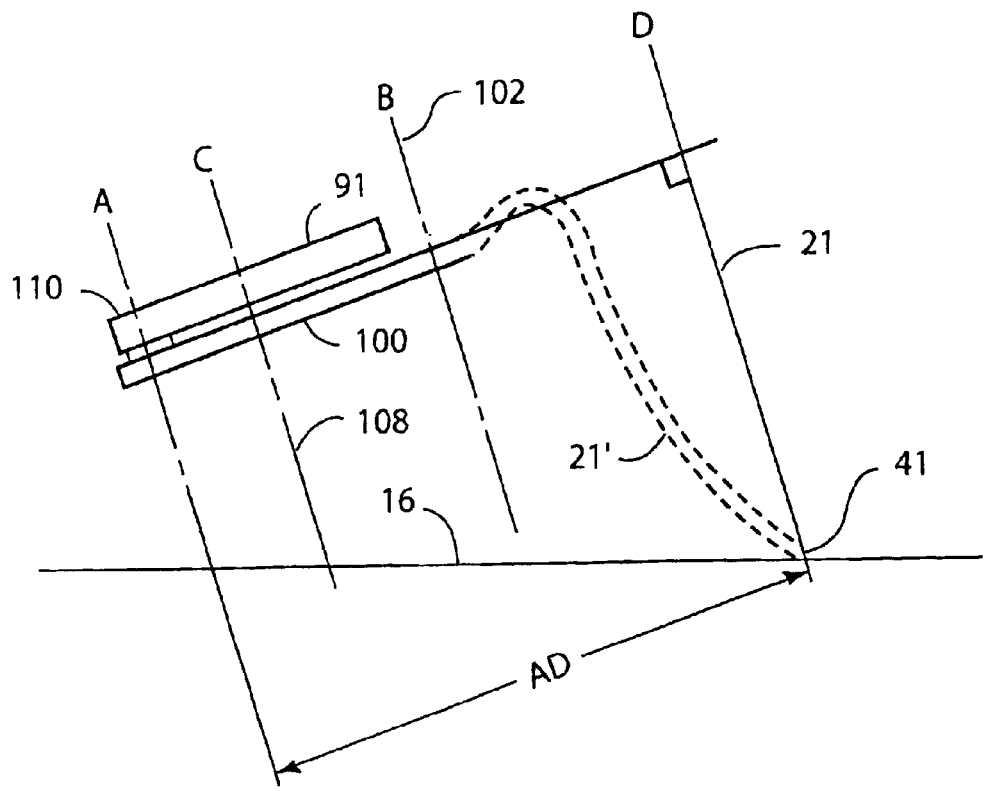
FIG. 12 is a graphical representation of an example foot movement produced by a crank and lever device.
Figure 13:
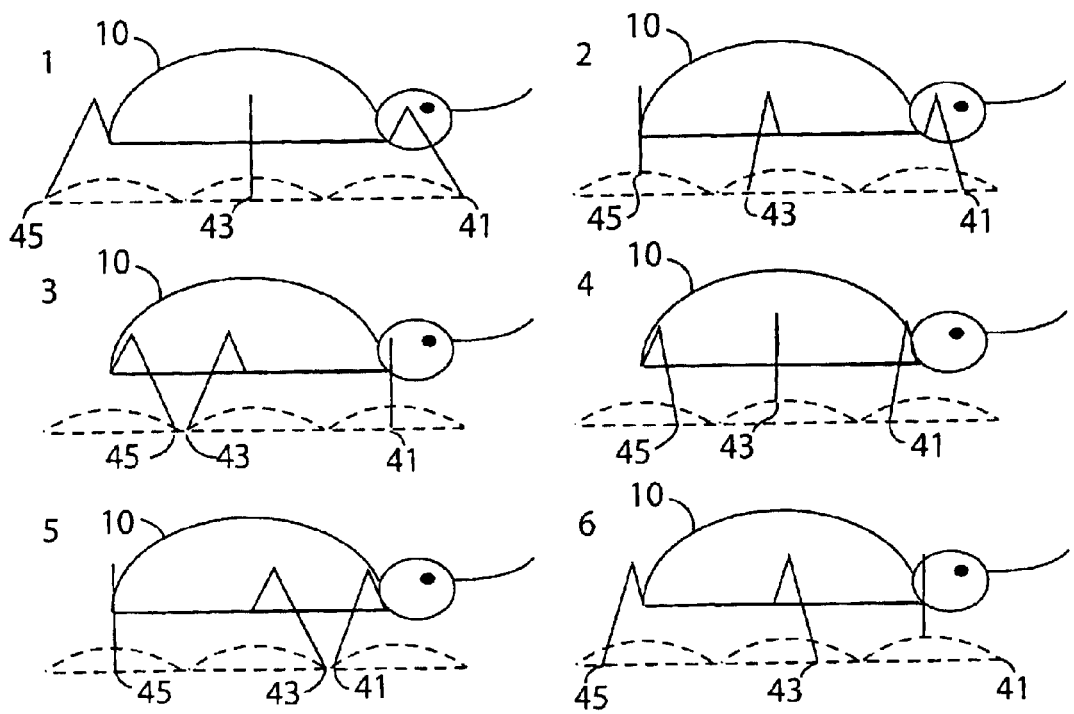
FIG. 13 is a diagrammatic illustration of how movement of a plurality of legs can be sequenced according to this invention to propel the device while providing stability for the device.

For reasons of aesthetics, such as more realistic-looking bug legs, it may be desirable to use leg struts of different shapes, such as the curved leg strut 21' in FIG. 13, rather than the straight leg strut extension 21 shown in FIGS. 1, 9, and 10. The shape of the leg strut does not change foot 41 motion or performance so long as the foot 41 is held in the same position with respect to the crank pin 110, pivot axis 102, and sliding leg lever 100, regardless what shape or configuration the leg strut is given to place the foot 41 in such position. In other words, as long as the REQUIRED distance AD in a plane perpendicular to the crank axis 108 is still maintained, as explained above in the FIG. 12 embodiment, it does not matter how the leg strut 21 is shaped.

Figure 14:
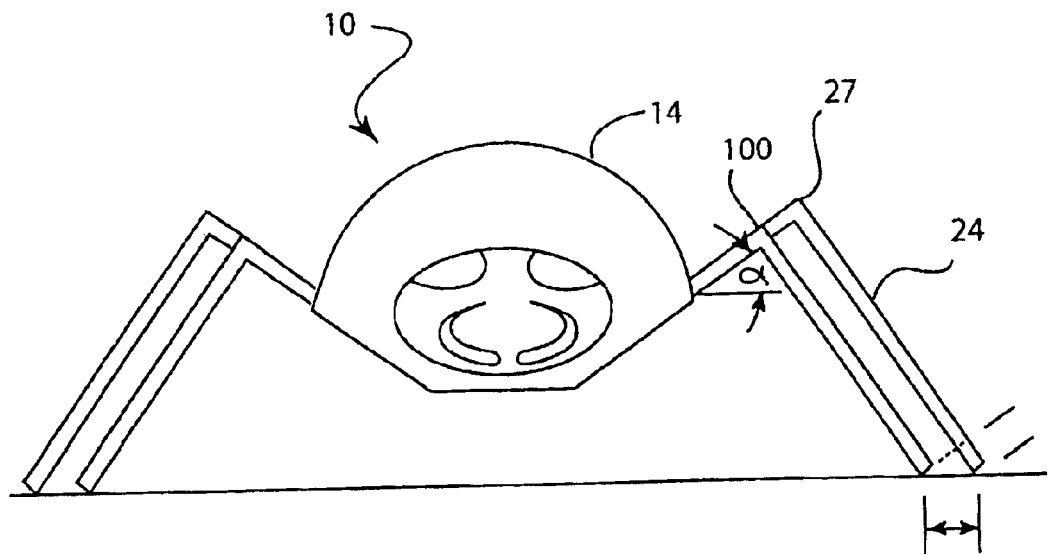
FIG. 14 is a diagrammatic front elevation of the device of this invention illustrating an optional lateral offset of some legs with respect to the device body.

As mentioned above, for the 6-legged object 10 shown in FIG. 1, it may be desirable to gang the right side drive mechanisms 31, 33, 35 with their respective crank wheels 91 locked 120-degrees out of phase with each other in order to get the stability of, for example, that shown in the 60-degree crank rotation sequence in FIG. 13, where at least two of the three feet 41, 43, 45 engage the surface 16 in stride strokes at any instant in time. The three left side drive mechanisms 32, 34, 36 would be similarly ganged for the same purpose. It may also be desirable, but not necessary, to stagger the center leg struts 23, 24 outwardly for aesthetic purposes, as shown in FIG. 14. Because of the inclined angle α at which the leg levers 100 extend outwardly from the body 14, the center leg lever 100 extends to a higher "knee" 27 than the front and rear leg levers, so the center leg strut 24 must be longer. However, because of the principles explained above, the invention can accommodate this variation, for example, by placing the center drive mechanisms 33, 34 farther laterally outward than the front and rear drive mechanisms 31, 32, 35, 36, as shown in FIG. 15.

Figure 15:
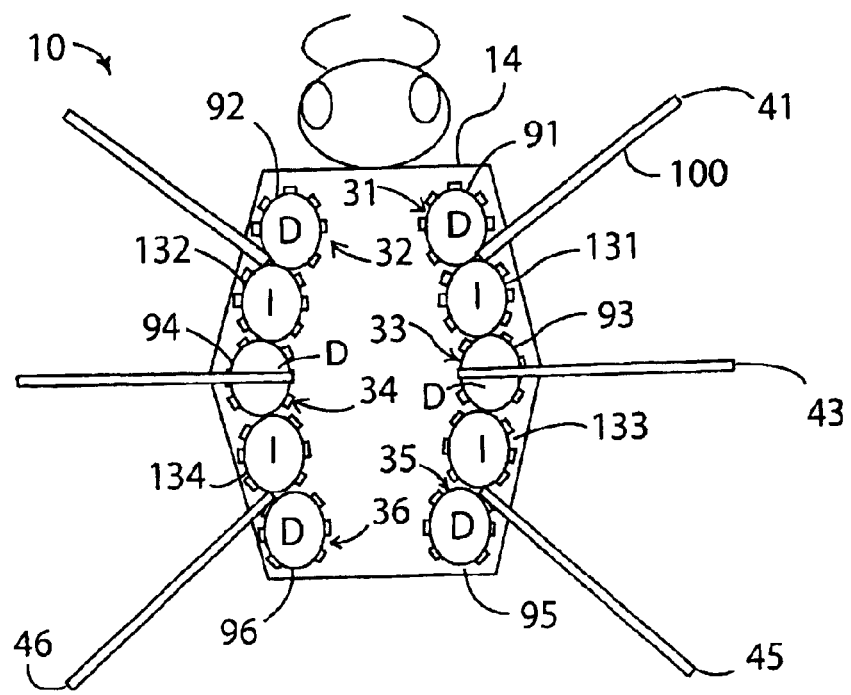
FIG. 15 is a diagrammatic plan view of a 6-legged device showing how the crank and lever mechanisms for the legs on the respective left and right sides of the device can be ganged together for coordinating the sequential movement of the legs as illustrated in FIG. 14 while also providing the lateral offset profile of the center legs on each side as shown in FIG. 16.

As also shown in FIG. 15, the right side drive mechanisms 31, 33, 35 can be ganged together by providing their crank wheels 91, 93, 95 in the form of gears interconnected by idler gears 131, 133. Likewise, the left side drive mechanisms 32, 34, 36 can be ganged together by idler gears 132, 134. Again, the ganged right side drive mechanisms 31, 33, 35 operate independently from the ganged left side drive mechanisms 32, 34, 36, so they can be accelerated or decelerated independently for greater steering, turning, and maneuverability capabilities.

Figure 16:
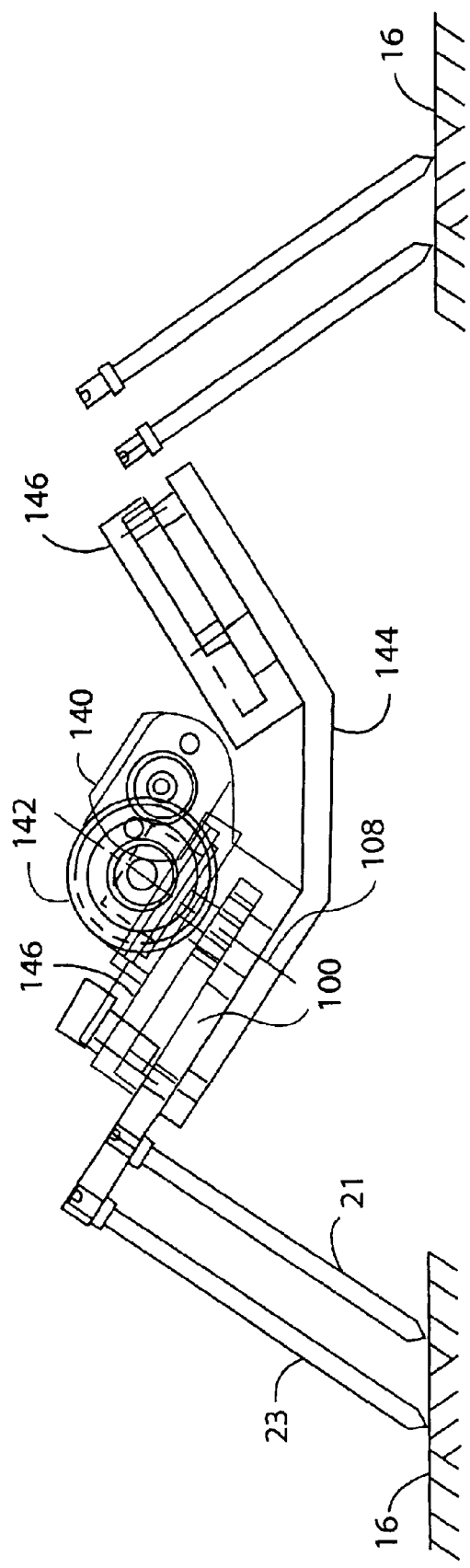
FIG. 16 is a front elevation view of a suitable frame and components for structuring an ambulatory device with the crank and lever system of this invention.
Figure 17:
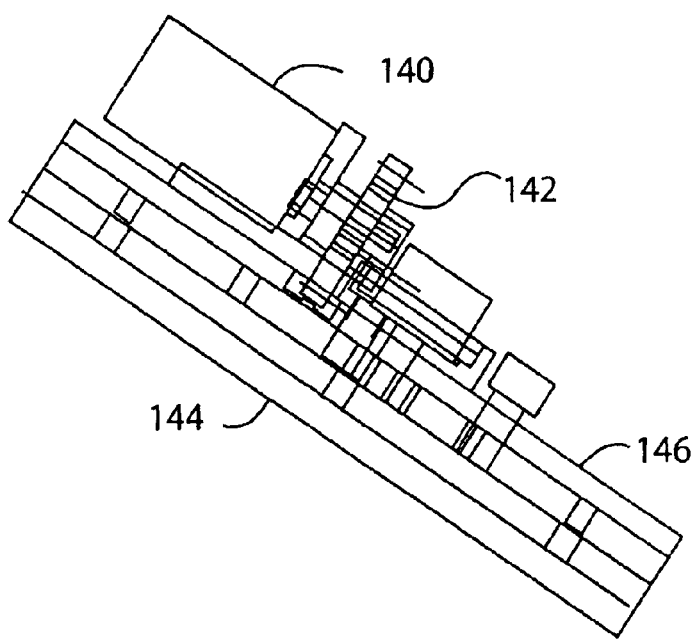
FIG. 17 is side elevation of the frame and mechanism of FIG. 16.
Figure 18:
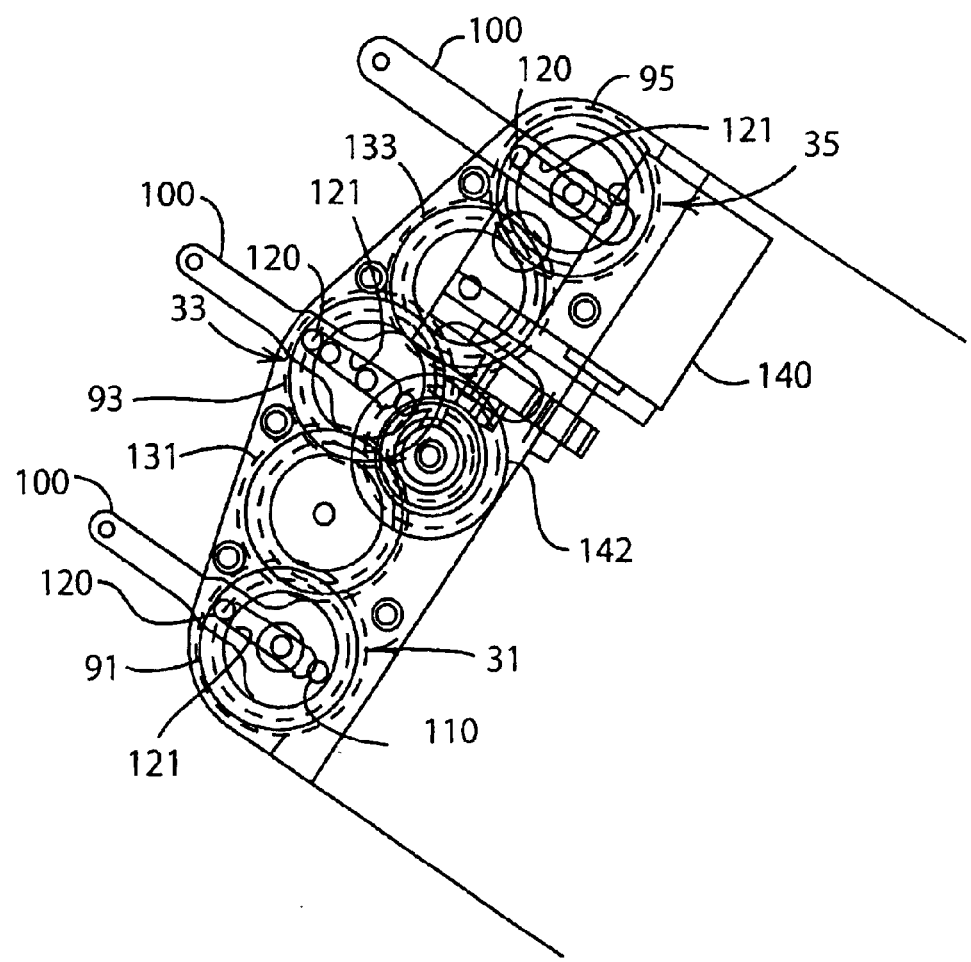
FIG. 18 is a top plan view of the frame and mechanism of FIG. 16.
Figure 19:
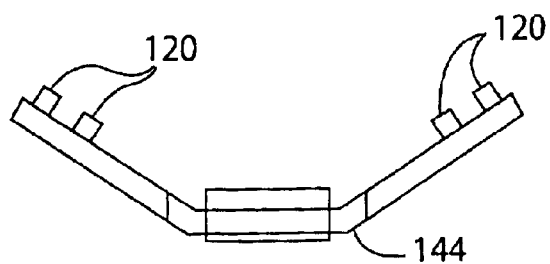
FIG. 19 is a front elevation view of the bottom frame only of the device of FIG. 16.
Figure 20:
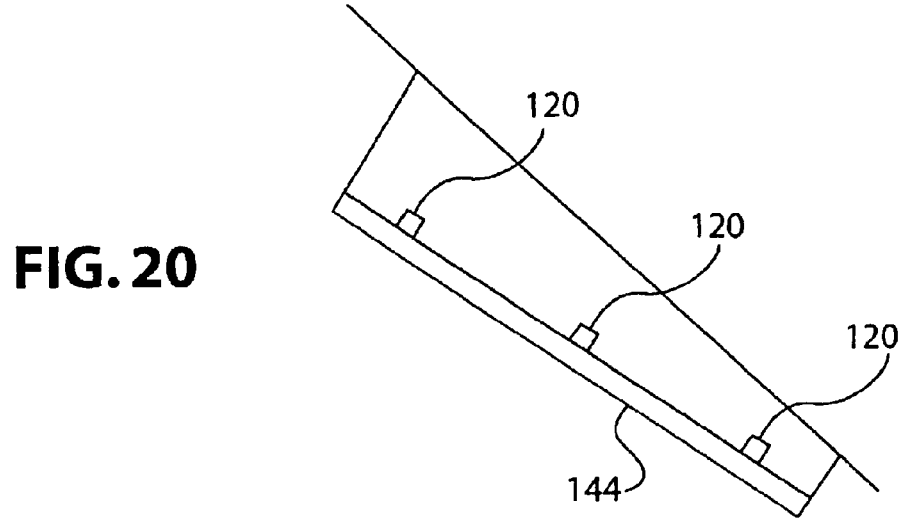
FIG. 20 is a side elevation view of the frame of FIG. 19.
Figure 21:
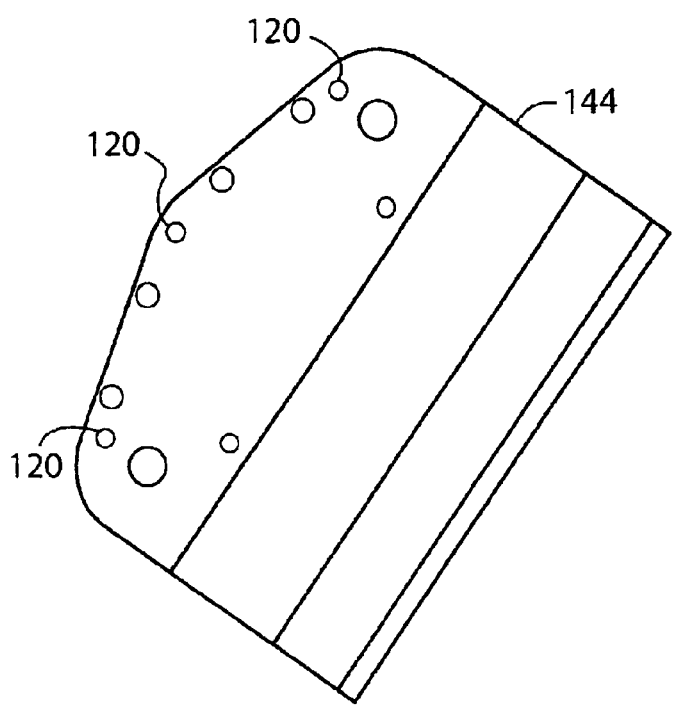
FIG. 21 is a top plan view of the frame of FIG. 19.
Figure 22:
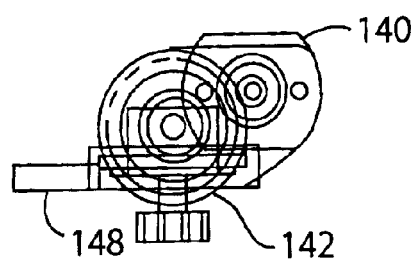
FIG. 22 is a front elevation view of the motor and gear drive of the mechanism of FIG. 16.
Figure 23:
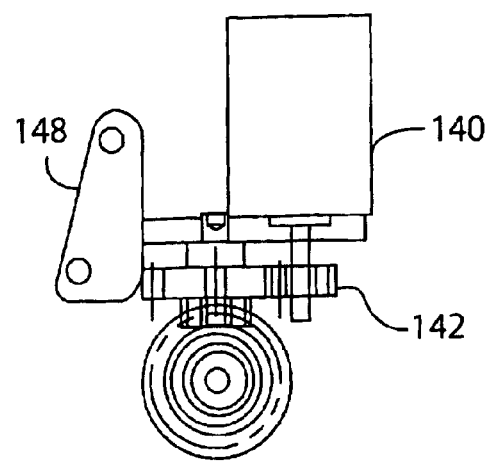
FIG. 23 is a side elevation view of the motor and gear drive of the mechanism of FIG. 16.
Figure 24:
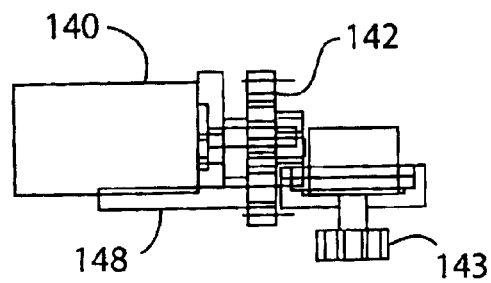
FIG. 24 is a top plan view of the motor and gear drive of the mechanism of FIG. 16.

An example, implementation of the ganged drive mechanisms 31, 33, 35 is shown in FIGS. 16, 17, and 18, which can be mounted in the body 14 of the object 10 in FIG. 1. Power is generated by a motor 140 through a gear reduction assembly 142 and engages the right center crank drive gear 93. Power is transmitted to the right front drive gear 91 by the idler gear 131 and to the right rear drive gear 95 by the idler gear 133. The drive gears 91, 93, 95 connect to the leg levers 100 through off-set, eccentric crank pins 110. The leg lever 100 is sandwiched between the belly plate or frame 144 and the cover plate 146. This sandwich structure constrains the leg levers 100 to planar motion in a plane perpendicular to the crank axis 108, which are tilted with respect to the support surface 16, as explained above. The left side drive mechanisms 32, 34, 36 (not shown completely in FIGS. 17–18, are the same as the right side drive mechanisms 31, 33, 35. The belly plate or frame 144 is shown alone in FIGS. 19–21 with its six pivot pins 120, which mate with, and slidingly and pivotally engage the slotted holes 121 as best seen in FIGS. 6 and 16. The motor 140 and gear reduction assembly are best seen in FIGS. 22–24 on the mounting bracket 148.

As mentioned above, retarded or negative phase relationships in rearwardly positioned crank mechanisms can result in instability problems, so it is preferred that advanced or positive phase relationships in rearwardly positioned crank mechanisms be maintained, if possible. To explain, reference is made to the illustration in FIG. 25 of an example undesirable retarded or negative phase relationship. For purposes of explaining the undesirable, retarded phase relationship that can result in unstable conditions, some definitions are helpful. For example, forward, for purposes of this explanation, means the direction in which the drive mechanisms are propelling or attempting to propel the object 10, and rearward is the opposite of the direction of such propulsion. Therefore, according to this definition, when the body 14 is being propelled in the direction of the arrow 18, the crank mechanism 31 is considered to be the most forward of the crank mechanisms 31, 33, 35 on the right side of the object 10, while the middle crank mechanism 33 is positioned rearwardly with respect to crank mechanism 31, and the last crank mechanism 35 is positioned rearwardly with respect to the middle crank mechanism 33. Further, the phase relationships of the crank mechanisms 31, 33, 35 are referenced to the angular direction of rotation of the cranks 91, 93, 95 as they propel the object 10. When the direction of propulsion is forward as indicated by arrow 18, the angular direction of rotation of the cranks 91, 93, 95 is clockwise, as indicated by arrows 251, 253, 255. Therefore, advanced or positive phase relationship in this scenario is in the direction of the angular rotation 251, 253, 255, while retarded or negative phase relationship is opposite angular rotation direction 251, 252, 255. The terms advanced and positive phase relationship are used interchangeably, and the terms retarded and negative phase relationship are used interchangeably for purposes of this explanation.

Conversely, if the drive mechanisms 31, 33, 35 were propelling the object 10 in the direction opposite to arrow 18, the drive mechanism 35 would be most forward, followed by drive mechanism 33 and then by drive mechanism 31. Also, the cranks 91, 93, 95 would be rotating in the angular direction opposite arrows 251, 253, 255, so advanced and retarded phase relationships would also be reversed, when the object 10 is being propelled opposite to arrow 18.

These same definitions also apply to the ganged drive mechanisms 32, 34, 36 on the left side of the object 10, wherein the cranks 92, 94, 96 rotate counterclockwise as indicated by arrows 252, 254, 256 for propelling the object in the direction of arrow 18 and clockwise for the reverse direction, i.e., opposite arrow 18.

Figure 25:
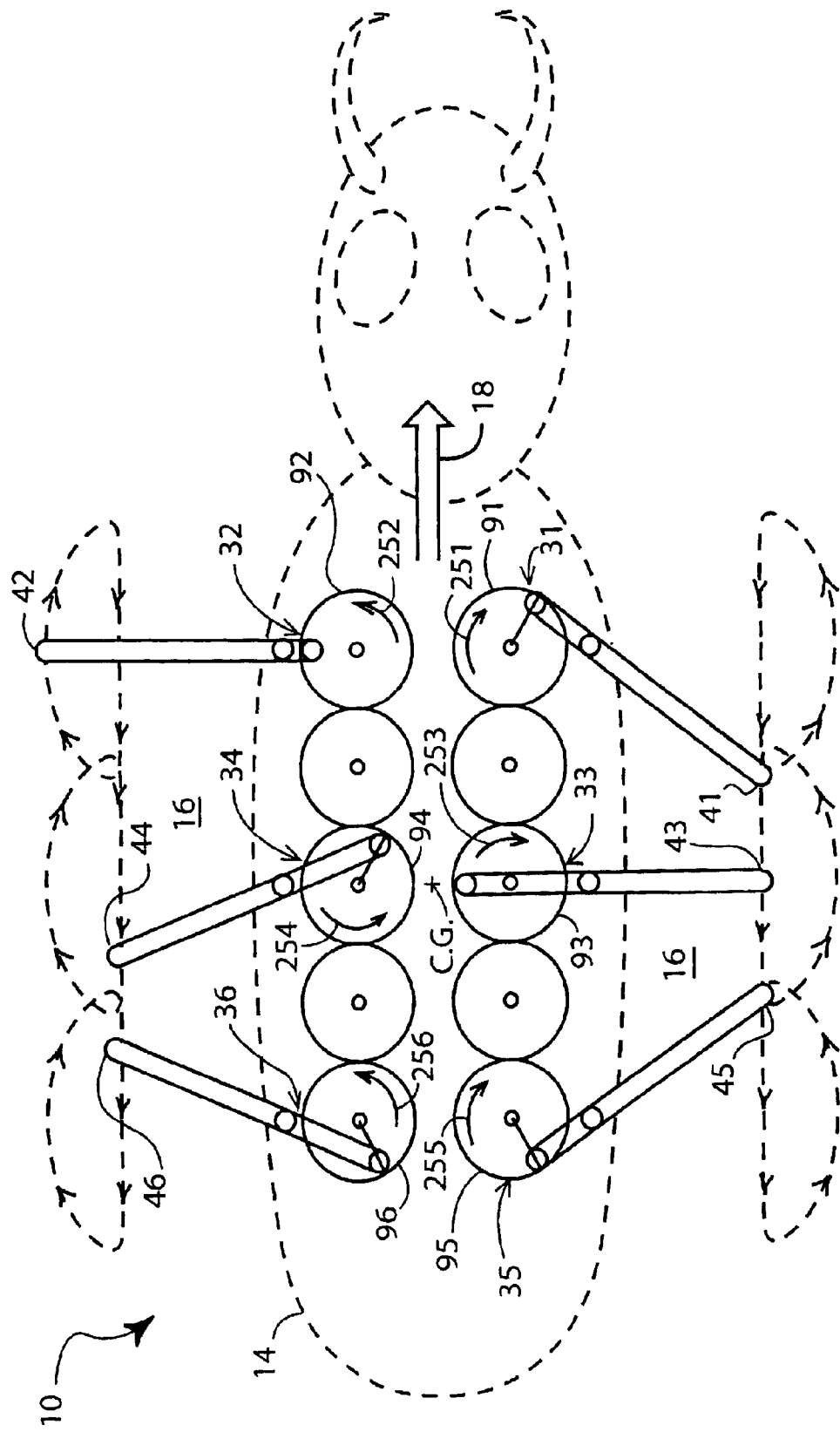
FIG. 25 is a diagrammatic plan view of a 6-legged device to illustrate undesirable successive phase retardation of the crank drive mechanisms.

More specifically, in the FIG. 25 arrangement, the forward crank 91 and drive mechanism 31 on the right side of the object 10 is advanced by 120 degrees in relation to the immediate rearward, i.e., middle, crank 93 and drive mechanism 33. Likewise, the middle crank 93 and drive mechanism 33 are advanced by 120 degrees in relation to the most rearward crank 95 and drive mechanism 35. Expressed another way, the forward-most crank 91 on the right side of the object 10 is advanced by 120 degrees in relation to the middle crank 93 on the right side, and the rearward-most crank 95 on the right side is retarded by 120 degrees in relation to the right middle crank 93.

Similarly, on the left side of the, object, the forward-most crank 92 on the left side is advanced by 120 degrees in relation to the left middle crank 94, while the rearward-most crank 96 on the left side is retarded by 120 degrees in relation to the left middle crank 94.

This undesirable, successive rearward phase retardation, where each successive rearward crank and drive mechanism is retarded by another 120 degrees, causes some unstable leg lever configurations, two examples of which are illustrated in FIG. 25. On the right side of the object 10, this successive retardation of the ganged right-side cranks 91, 93, 95 is shown to position all three right-side feet 41, 43, 45 on the surface 16, but as close together as possible. This close placing of feet 41, 43, 45 makes the object 10 unstable and fairly easy to topple.

The left side feet 42, 44, 46 are shown in another example unstable condition that results from the successively rearward phase retardation described above. Specifically, the left front foot 42 is lifted off the ground or surface 16, while the two remaining left feet 44, 46 are positioned very close together and behind the center of gravity C.G. of the device 10. Again, this unstable setting of the feet 42, 44, 46 resulting from this successive rearward phase retardation of cranks 92, 94, 96 also makes the object 10 quite easy to topple, and, if the right side had the same situation of the only planted feet being behind the center of gravity C.G., the object 10 would tip over due to gravity alone. Again, these example unstable configurations illustrated in FIG. 25 are not the only unstable configurations that result from this arrangement, but they illustrate the problem.

Figure 26:
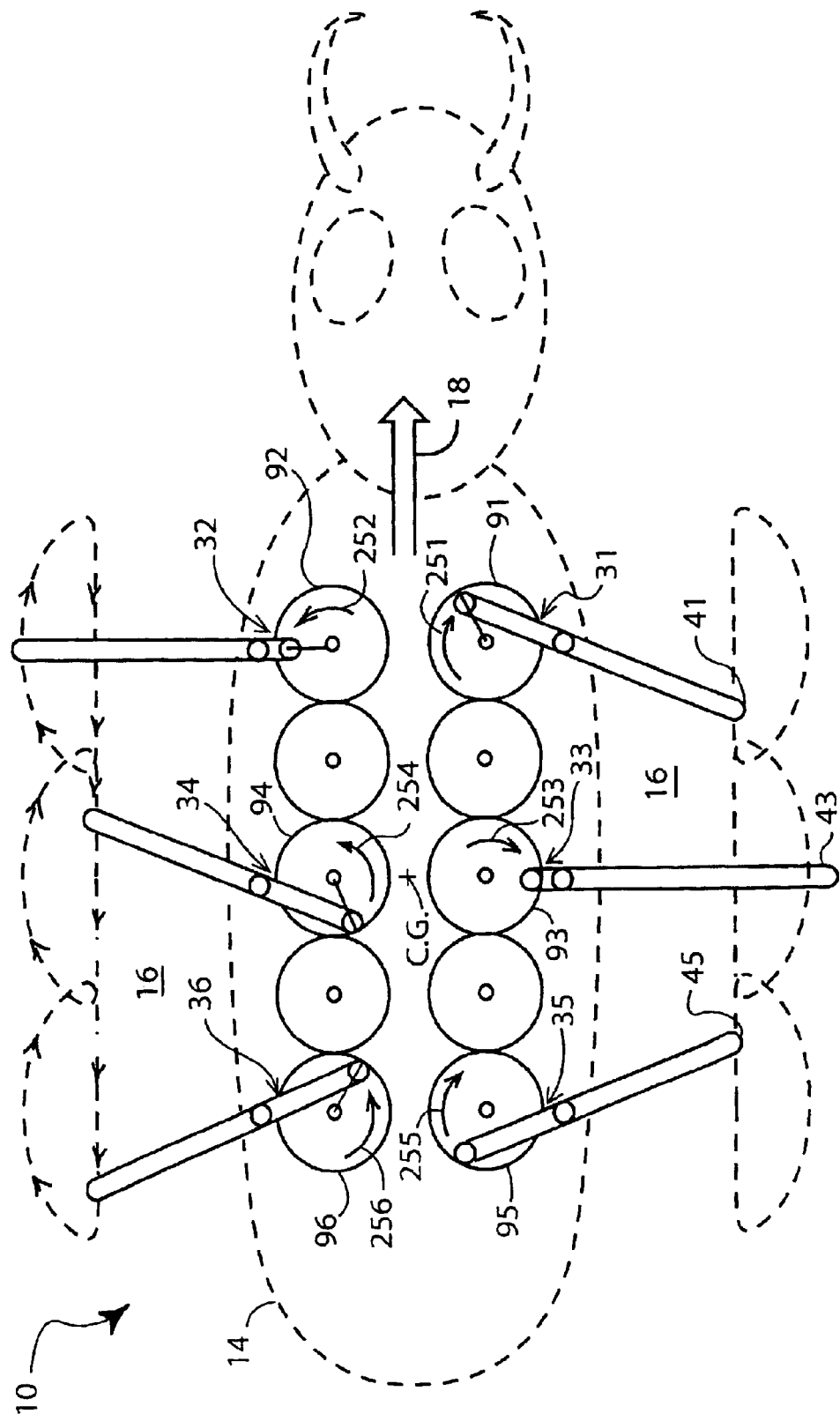
FIG. 26 is a diagrammatic plan view similar to FIG. 25, but illustrating a preferred successive phase advancement of the crank drive mechanisms.

To avoid these and other unstable configurations, a preferred phase relationship illustrated in FIG. 26 is set with the gang of right-side drive mechanisms 31, 33, 35 so that each successive rearward crank 33, 35 has its crank 91, 93, 95 advanced by 120 degrees in relation to the right front or forward-most crank drive mechanism. In other words, right middle crank 93 in FIG. 26 is advanced by 120 degrees in relation to right front crank 91, and right rearward crank 95 is advanced by 120 degrees in relation to right middle crank 93. Similarly on the left side of the object 10 in FIG. 26, the left middle crank 94 is advanced by 120 degrees in relation to the left forward-most crank 92, and the left rearward-most crank 96 is advanced by 120 degrees in relation to the left middle crank 94.

As illustrated in FIG. 26, this successive rearward advanced phase crank relationship avoids the unstable leg and feet positions of the FIG. 25 successive rearward retarded phase crank relationships. For example, whereas the front left foot 42 in both FIGS. 25 and 26 are extended and lifted off the surface 16, the other two left feet 44, 46 in FIG. 26 are planted far apart on the surface 16 with one ahead of the center of gravity C.G. and the other behind the center of gravity C.G. to enhance stability, which is in contrast to the narrow, close spacing of the left feet 44, 46, both behind the center of gravity C.G., in FIG. 25. The right side example of FIG. 26 illustrates that the closest that the front foot 41 and rear foot 45 get to each other in the successive rearward advanced phase relationship of the cranks of FIG. 26 is not as close as those feet 41, 45 get to each other in the successive rearward retarded phase relationship of FIG. 25.

Figure 27:
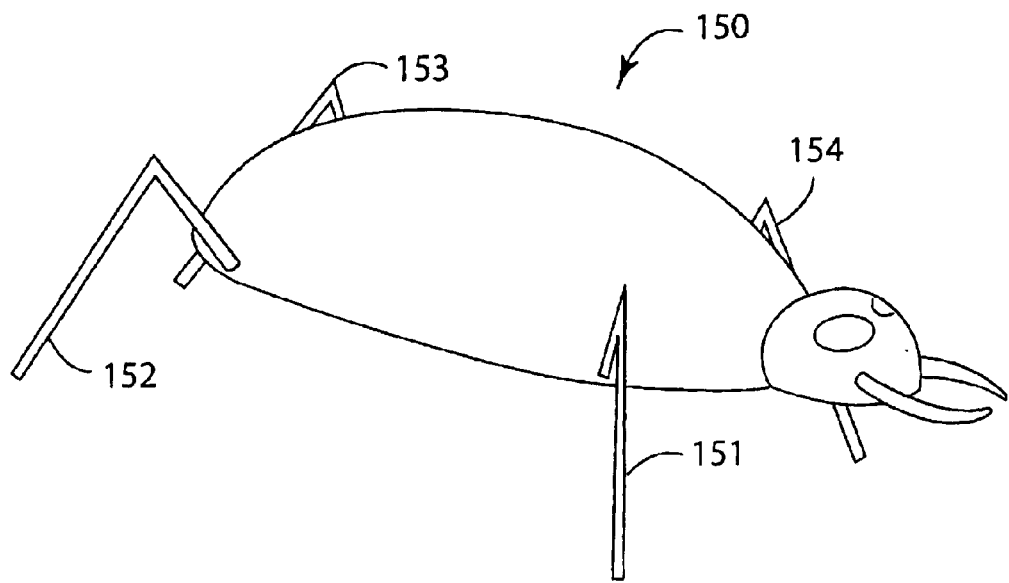
FIG. 27 is a perspective diagrammatic view of a bug-shaped device driven by four crank and lever leg mechanisms of this invention.

As mentioned above, the ability to keep the feet engaged with the support surface 16 in their stride strokes through a large portion (as much as two-thirds) of the crank wheel or gear rotations makes it feasible to also use the crank leg drive mechanisms of this invention in devices that have only four legs and still maintain stability. Such a 4-legged bug-like device 150 is shown, for example, in FIG. 27. The four legs 151, 152, 153, 154 are in lock-step and sequenced or phased so as to always maintain at least three of the four legs 151, 152, 153, 154 in their stride strokes in contact with the support surface at any instant in time. When one of the legs is returning in the raised step stroke in the manner explained above, the remaining three legs in their stride strokes form a tripod, which supports and stabilizes the center of mass of the object 150. Such a 4-legged object 150 is suited to applications in which straight-line motion without turning or steering capability is desired or sufficient, such as free-running, uncontrolled devices, devices guided by walls, and other such applications.

Figure 28:
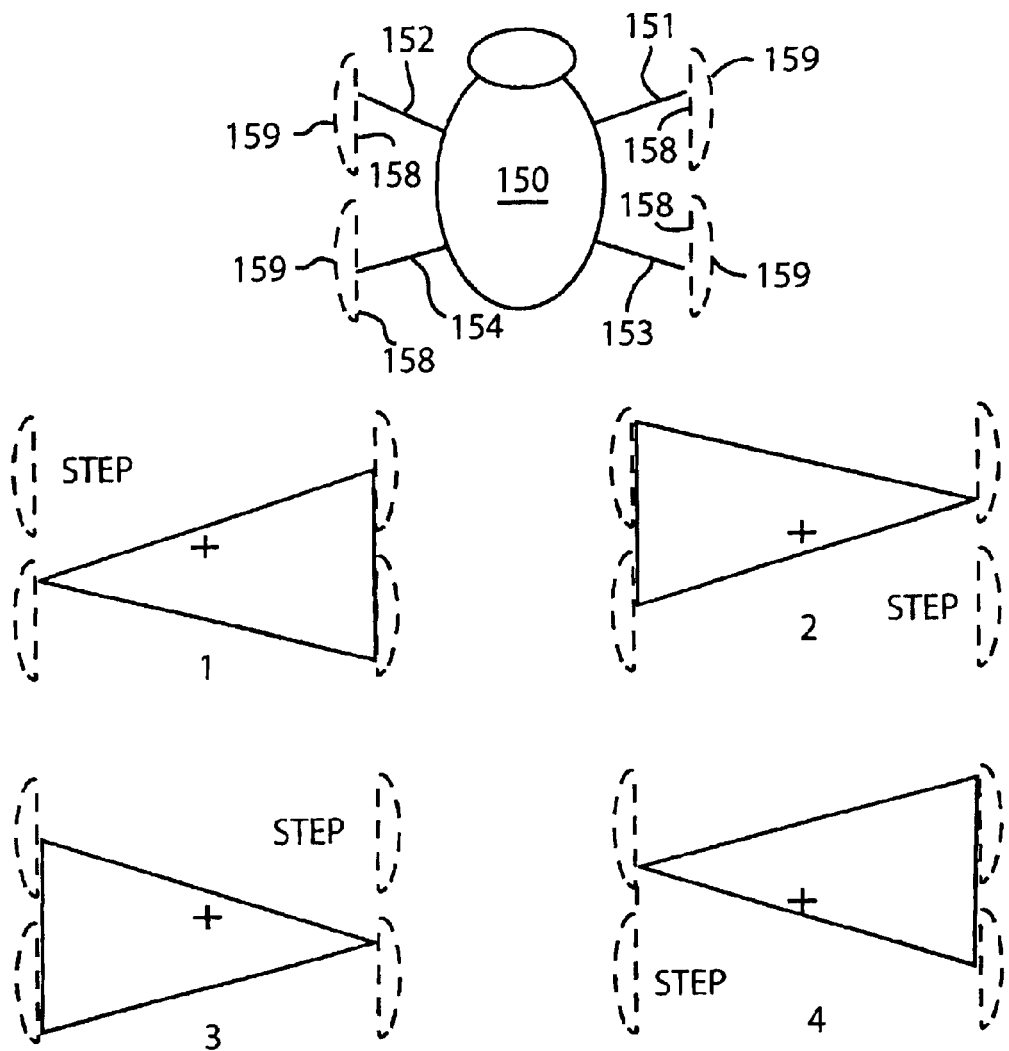
FIG. 28 is a diagrammatic plan view of the four-legged device of FIG. 27 with illustrations of step sequences for the legs that provide stability for the device.
Figure 29:
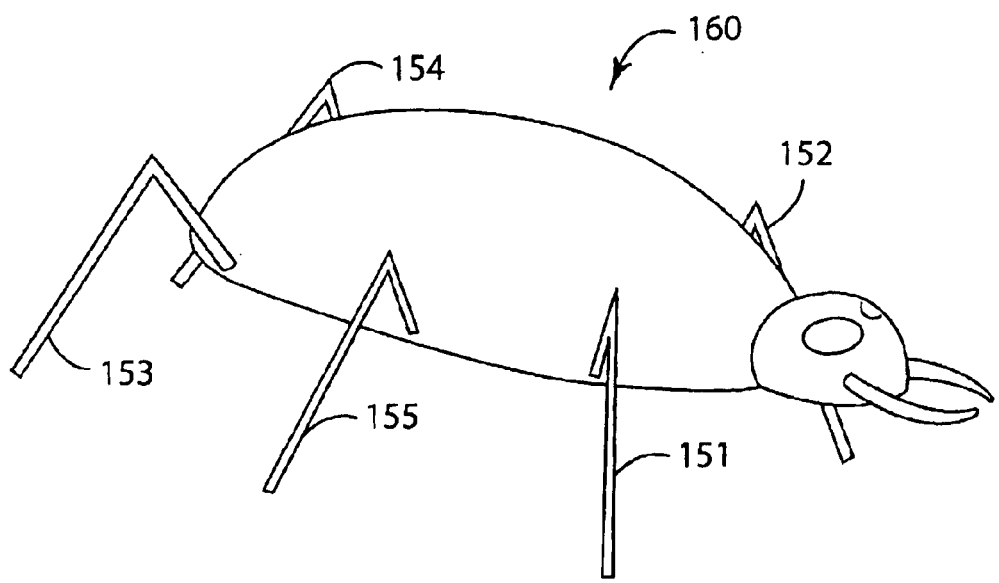
FIG. 29 is a perspective diagrammatic view of a device similar to the four-legged device of FIG. 27, but with the addition of two faux legs for additional steering capabilities.

A preferred leg phasing for such a 4-legged object 150 is shown in FIG. 28, where the sequence of leg phases 1–4 depicts a complete revolution of the drive gears in 90-degree increments. The phantom lines indicate the stride 158 and step 159 paths of the feet at the distal ends of legs 151, 152, 153, 154, as explained above for the six-legged object 10.

A modified 4-legged device 160 equipped with two additional faux legs 155, 156 connected by a pivotal cross axle 157 is shown in FIGS. 29–33. This embodiment 160 can move straight forward rapidly and smoothly and turn in reverse without tipping on a reasonably smooth support surface. When the device 160 moves forwardly, the two faux legs 155, 156 drag lightly and do not interfere with the normal stride 158 and stepping 159 strokes of the four legs 151, 152, 153, 154. However, when the four legs 151, 152, 153, 154 are operated in reverse, the right side faux leg 155, which is longer than the left side faux leg 156 and longer than the regular legs 151, 152, 153, 154, engages the support surface and raises the right side of the device 160 enough to lift the right legs 151, 153 off the support surface, thereby becoming a pivot point about which the surface engaging legs will turn the device 160.

Figure 30:
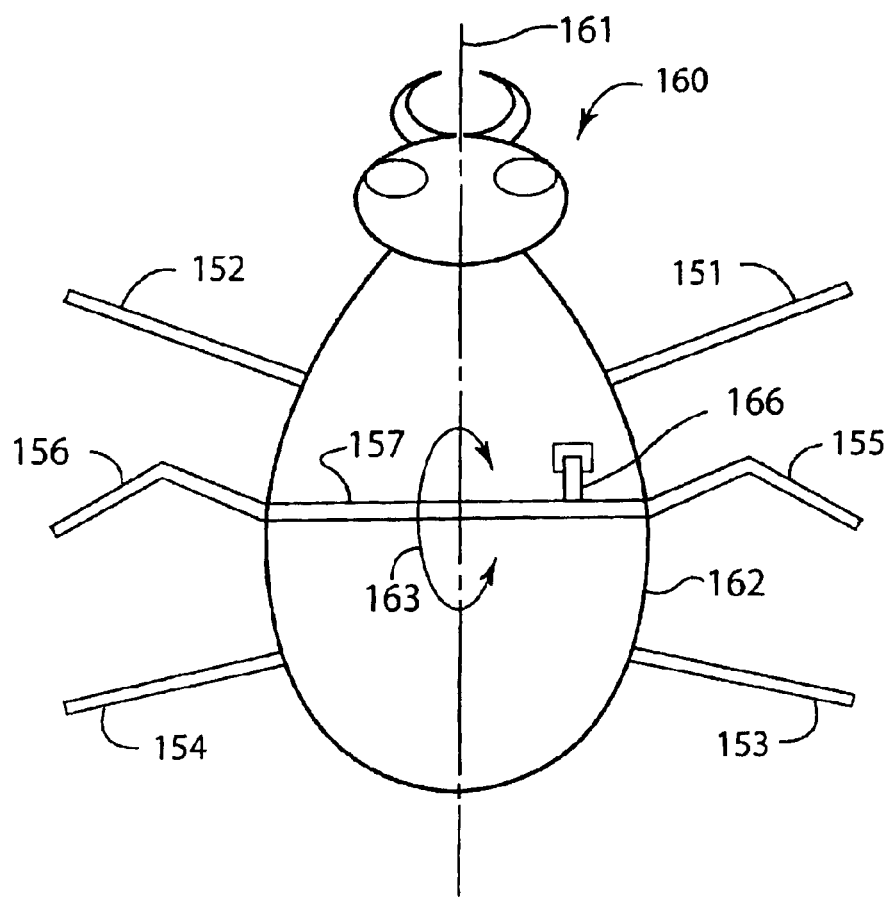
FIG. 30 is a diagrammatic plan view of the device of FIG. 29 illustrating the structure and function of the faux legs.

As best seen in FIG. 30, the two faux legs 155, 156 are connected by the axle 157, which extends transversely across the device 160, i.e., perpendicular to forward motion in the direction of the longitudinal axis 161. The two faux legs 155, 156 are connected solidly to the axle 157, which is mounted pivotally to the body 162 in a manner that allows pivotal movement as indicated by arrow 163. Therefore, both of the faux legs 155, 156 pivot in unison with each other.

Figure 31:
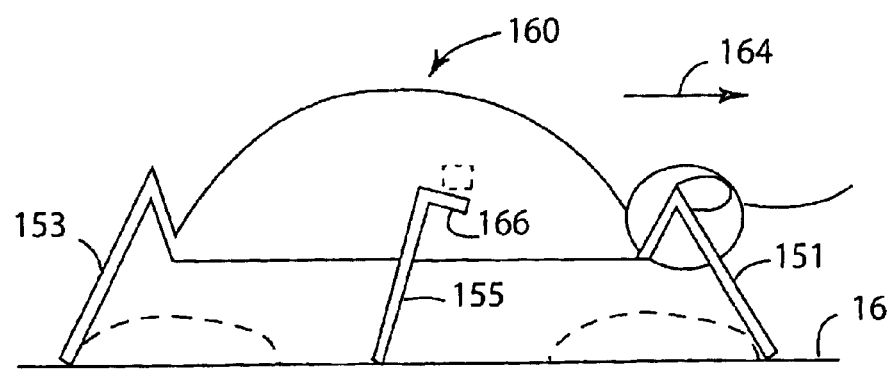
FIG. 31 is a diagrammatic side elevation view of the device of FIG. 29 illustrating the faux leg position during forward motion.

One of the faux legs 155, 156, for example, the right faux leg 155, is slightly longer than the nominal leg length of legs 151, 152, 153, 154, and the left faux leg 156 is slightly shorter or about the same as the legs 151, 152, 153, 154. During forward motion 164, the right faux legs drags behind on the support surface 16, as illustrated in FIG. 31. As the right faux leg 155 starts dragging behind, the axle 157 pivots to slightly lift the shorter left faux leg 156 above the support surface 16. In this condition, forward motion 164 of the device 160 proceeds normally other than the slight, generally insignificant, dragging of the right faux leg 155 on the support surface 16.

Figure 32:
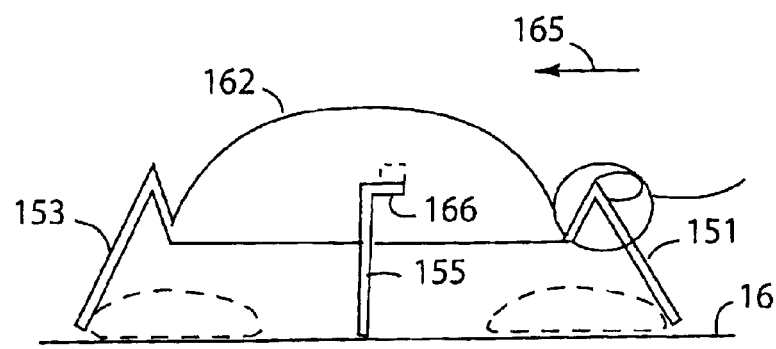
FIG. 32 is a diagrammatic side elevation view similar to FIG. 31, but illustrating the position and function of the longer faux leg on one side of the device during reverse/turning motion.
Figure 33:
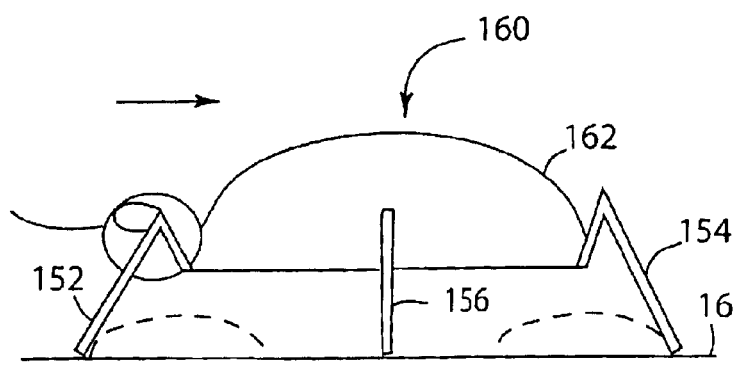
FIG. 33 is a diagrammatic elevation view of the opposite side of the device of FIG. 29 to illustrate the position and function of the shorter faux leg during the reverse/turning motion.

However, when the motion of the device 160 is reversed 165 by reversing rotational direction of the crank drive mechanisms (not shown in FIG. 32), the right faux leg 155 engages frictionally with the support surface 16 and pivots forwardly with respect to the reverse 165 moving body 162 as shown in FIG. 32. Since the right faux leg 155 is slightly longer than the other legs 151, 152, 153, 154, it lifts the right side of the device 160, thereby lifting the right front leg 151 and/or the right rear leg 153 off the support surface 16, as also shown in FIG. 32. A limit stop 166 of some kind connected to the axle 157 can be provided to prevent the right faux leg from pivoting far enough to merely drag in the reverse direction 165. Since the right legs 151, 153 no longer engage the surface 16, the right faux leg 155 becomes a pivot point for turning the device 160. At the same time, as shown in FIG. 33, the left faux leg 156 is pivoted by the axle 157 into position to maintain height, balance, and stability as each of the other left side legs 152, 154 stride and step.

Figure 34:
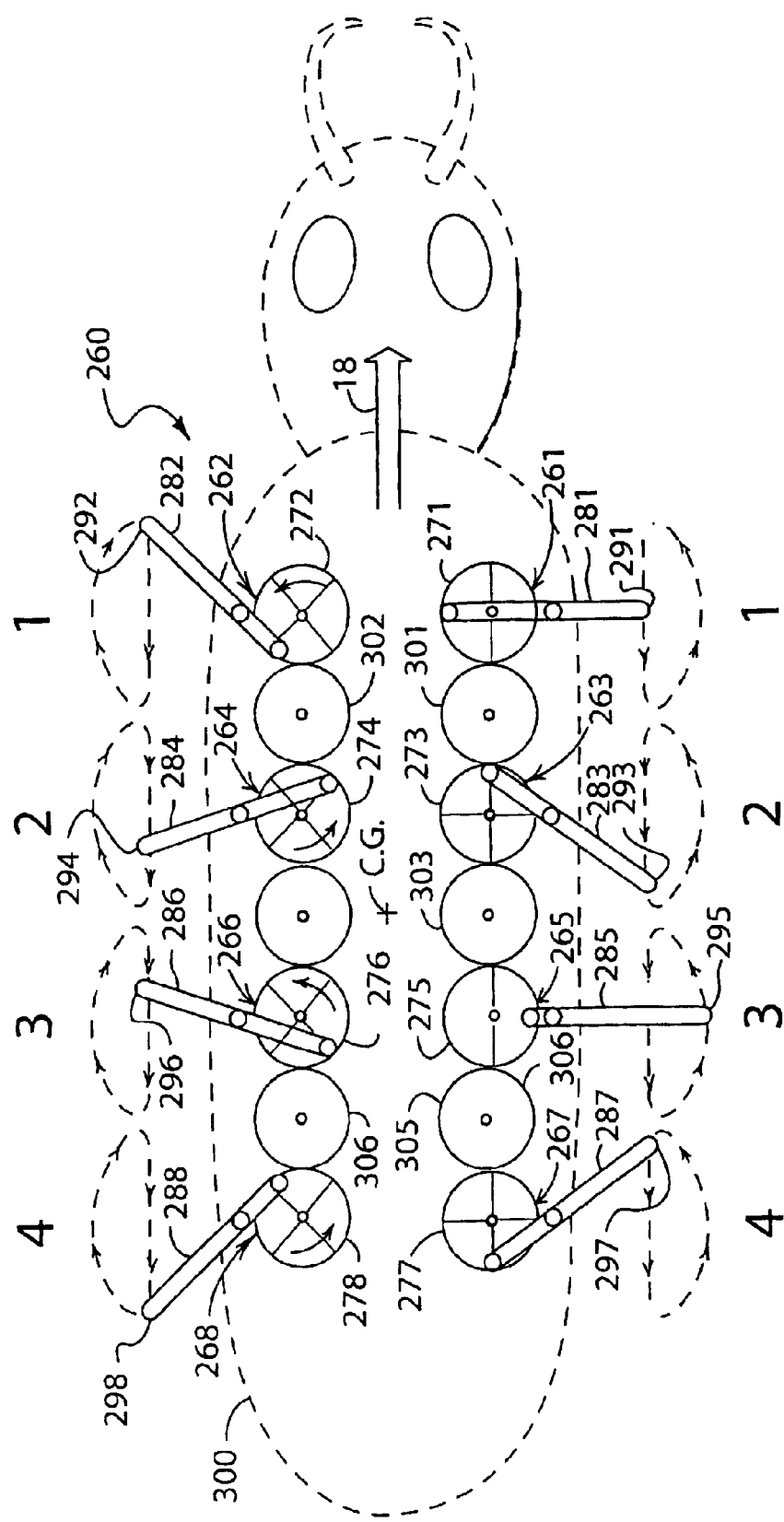
FIG. 34 is a diagrammatic plan view illustration of a ganged four-legged phase sequence.

An 8-legged ambulatory object 260 is shown in FIG. 34 to illustrate application of the crank drive mechanisms of this invention in example stepping sequences of gangs of four legs. Any of the crank drive mechanisms described or covered herein can be used, although the example in FIG. 34 is illustrated with crank drive mechanisms 261, 262, 263, 264, 265, 266, 267, 268 structured in the manner shown in FIGS. 1–10 and described above.

In FIG. 8, the example object 260 has two sets of legs, one set on each side of the object 260. For example, a set of four legs 281, 283, 285, 287 on the right side of the object 260 are driven by respective crank drive mechanisms 261, 263, 265, 267, in which the respective crank gears 271, 273, 275, 277 are driven and ganged together by idler gears 301, 303, 305. Likewise, another set of four legs 282, 284, 286, 288 on the left side of the object 260 are driven by respective crank drive mechanisms 262, 264, 266, 268, in which the respective crank gears 272, 274, 276, 278 are driven and ganged together by idler gears 302, 304, 306. Each set of four legs are ganged together and sequenced in such a way that balance and stability is maintained. For the stepping sequences described herein, it is assumed that the object 260 has the ability to be steered, as described above for the object 10 (FIG. 1, et seq.), which requires that each of these sets of legs must operate independent of each other.

For convenience and to facilitate this explanation of the 4-legged gangs of FIG. 34, the legs on each side of the object 260 are numbered from front to back as 1, 2, 3, 4. Thus, for the ganged set of legs 281, 283, 285, 287 on the right side (the right side legs), leg 281 is designated as 1, leg 283 is designated as 2, leg 285 is designated as 3, and leg 287 is designated as 4. Likewise, for the ganged set of legs 282, 284, 286, 288 on the left side (the left side legs), leg 282 is designated as 1, leg 284 is designated as 2, leg 286 is designated as 3, and leg 288 is designated as 4.

Also, for convenience, it is assumed that the stepping of each leg in a sequence occurs at regular intervals, e.g., a new leg steps with each 90 degrees rotation of the right side crank gears 271, 273, 275, 277. Likewise, for the left side legs 282, 284, 286, 288, a new one of such legs steps with each 90 degrees rotation of the left side crank gears 272, 274, 276, 278.

To illustrate both of these points by example, a particular stepping sequence, such as that shown by the left side legs 282, 284, 286, 288 of FIG. 34, could be indicated as "4-2-3-1". In other words, first, leg number 4 (the rear leg 288) begins a step. Then, after one-fourth of a revolution, i.e., 90 degrees, of the crank gears 272, 274, 276, 278, leg number 2 (the near front leg 284) begins its step. Then, after another one-fourth of a revolution of the crank gears 272, 274, 276, 278, leg number 3 (the near rear leg 286) begins its step. Then after still another one-fourth revolution of the cranks 272, 274, 276, 278, leg number 1 (the front leg 282) begins its step. The sequence begins again after yet another one-fourth revolution of the crank gears.

There are also six possible stepping sequences in which two or more legs step together:

1-2-3-4
1-2-4-3
1-3-2-4
1-3-4-2
1-4-3-2
1-4-2-3

For each sequence considered, it is desirable that the legs 281, 283, 285, 287 on one side and the legs 282, 284, 286, 288 on the other side be as closely spaced along the body 300 as possible, without causing the feet 291, 293, 295, 297 in the right side gang or the feet 292, 294, 296, 298 in the left side gang to interfere with each other. Also, it is necessary that balance around the center of gravity C.G. be maintained for stability.

However, if there is a need for very close spacing of the legs along a side of the body 300, there are two possible leg sequences that avoid the problem of adjacent legs interfering with each other. They are:

1-2-3-4
1-3-4-2

In other words, in each of these sequences, there is never a time when one of two adjacent legs is all the way back and the other is all the way forward, thus avoiding interference between two adjacent feet. Of these two sequences, the 1-3-4-2 sequence has better balance, because, at any instant in time, the feet straddle the center of gravity C.G. by greater distances than in the 1-2-3-4 sequence.

If balance only is considered, i.e., the legs can be spaced far enough apart to avoid interference between adjacent feet or legs, then the remaining four leg sequences are:

1-2-4-3
1-3-2-4
1-4-3-2
1-4-2-3

Of these four leg sequences, the sequence with the best balance is 1-4-3-2.

Another possibility is to set the crank phases so that two or more legs in a gang of four legs are caused to step simultaneously. Of course, three legs in a gang of four legs cannot be set or phased to step simultaneously without losing balance, since only one foot would be planted. Therefore, it makes more sense to consider only sequences in which exactly two legs step at a time, i.e., the sequences:

(1,2)-(3,4)
(1,3)-(2,4)
(1,4)-(3,2)

For purposes of balance in these three leg sequences, "X"-type sequences can be rejected, leaving the sequences:

(1,3)-(2,4)
(1,4)-(3,2)

Of these two leg sequences, the one with the best balance is (1,3)-(2,4).

In summary, there are three stepping sequences that are most desirable for respectively different design goals. For smooth operation and minimum leg spacing, the sequence 1-2-3-4 is most desirable. For a good compromise between smoothness, balance, and leg spacing, sequence 1-3-4-2 should be used. For good smoothness and best balance, the sequence 1-4-3-2 should be used. The sequence (1,3)-(2,4) should be used if vibration is not an issue and tandem stepping is desired.

Figure 35:
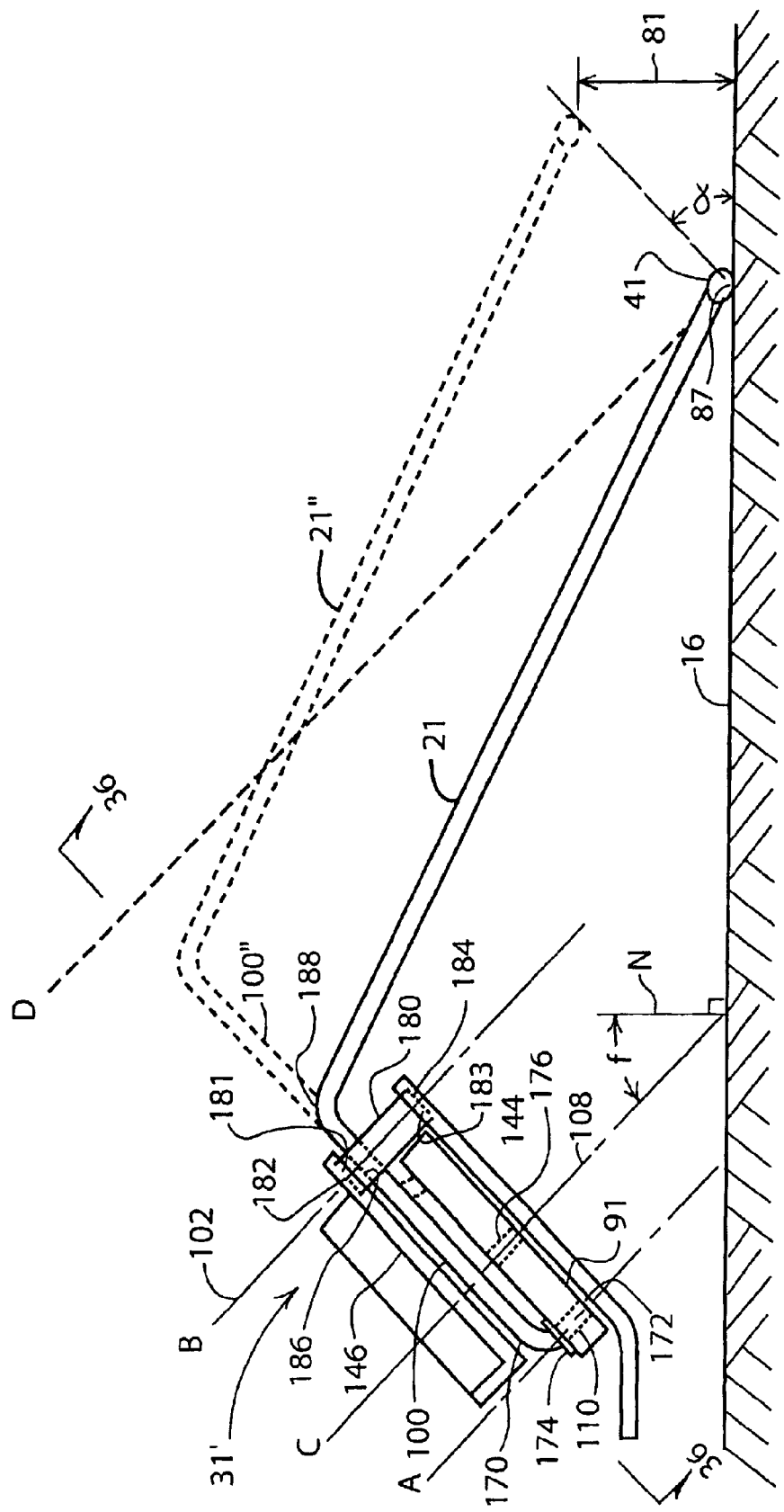
FIG. 35 is an elevation view of an alternate crank and lever embodiment of the invention.

As mentioned above, many suitable mechanical variations and embodiments of the crank and lever drive mechanisms for implementing this invention can be devised by persons skilled in the art, once they understand the principles of this invention. The important features of the unarticulated, tilted crank drive embodiments described above are a crank, a pivot, and a leg lever connected to the crank and restrained at the pivot in a manner that allows longitudinal but not lateral movement of the leg lever in relation to the pivot so that the leg lever can both pivot around and move longitudinally in relation to the pivot as explained above. One such variation or alternate embodiment crank drive mechanism or assembly 31' is shown in FIG. 35. This example variation or embodiment 31' has a single rod or wire 170 bent or formed into a configuration that comprises the leg lever 100 and leg strut 21, which may be easier to manufacture, and more reliable to operate. The crank wheel or gear 91 is mounted rotatably on a spindle or axle 176 extending upwardly from a bottom frame plate 144. The long, slender rod 170 is bent to form a crank pin portion 110 at its proximal end, which inserts into a crank hole 172 near the periphery of the crank gear 91. The leg lever portion 100 of the rod 170 extends from the crank pin portion 110 through a transverse hole or channel 186 in a pivotal support structure 180 to a knee bend 188, where the rod 170 is bent to extend as the leg strut 21 to a foot 41 at its distal end. The crank drive mechanism 31' is tilted, as described above, so that the crank axis 108 is at an angle α in relation to the normal N of the support surface 16. Therefore, as the crank gear 91 rotates on the axle 176 about the crank axis 108, it drives the leg lever portion 100 to move longitudinally and pivotally in relation to the pivot axis 102, as explained above and as indicated by the phantom lines 100", to move the leg strut 21 and foot 41 in the rectilinear and arcuate paths of stride and step strokes according to this invention (see, e.g., FIGS. 7 and 8). For heavier objects, where each leg strut 21 and lever 100 have to support a substantial weight, the pivotal support structure 180 may be preferred to be in the form of a fairly substantial pivot pin, as shown in FIG. 35, that is rotatably mounted at its top end 182 and at its bottom end 184 in respective recessed holes 181 and 183 in the top frame plate 146 and bottom frame plate 144, so that the support structure 180 is rotatable about the pivot axis 102. The transverse hole or channel 186 in the pivotal support structure 180 provides bearing surfaces that support weight of the object on the leg lever 100 as the leg lever 100 slides longitudinally back and forth through the hole or channel 186, and the ability of the support structure 180 to rotate in the recessed mounting holes 181, 183 allows the leg lever 100 to pivot about the pivot axis 102 as it is driven by the crank gear 91.

The weight of the object supported by the foot 41 at a point 87 on the surface 16, which is a lateral distance outwardly from the support structure 180 sets up a force couple that tends to rotate the elongated rod 170 in a vertical plane about the support structure 180 which tends to force the crank pin portion 110 of rod 170 into crank hole 172 and retain it there. A collar 174 can be provided on the crank pin portion 170 to hold the leg lever 100 away from the top surface of the crank gear 91. This function could also be provided by a crank hole 172 that does not extend all the way through the crank gear 91 so that the crank pin portion 110 hits the bottom of such a crank hole 172. Again, there are myriad ways that these assemblies can be made to provide the basic structures and functions described above for this invention.

For smaller objects and lighter weights, the support structure 180 can be even simpler, such as a thinner, stationary wall or strut so that the leg lever 100 can slide through and pivot in the hole 186 without the necessity of having the whole support structure 180 rotate about the pivot axis 102. The hole 186 in such a stationary wall or strut variation should be slightly larger than the diameter of the rod 170 and, for greater angles of the rod to the longitudinal axis of the hole 186, the hole 186 may be slightly elongated (not shown) to prevent binding. If both the rod 170 and such a stationary support structure 180 were metal, this combination would be conducive to flow of electricity from an electric plate (not shown) on the support surface, through the leg strut 21 and lever 100 portions of the rod 170 and, by metal-to-metal contact between the rod 170 and the support structure 180 in the pivot hole 186, through the support structure 180 to an electric motor (not shown in FIG. 35).

Figure 36:
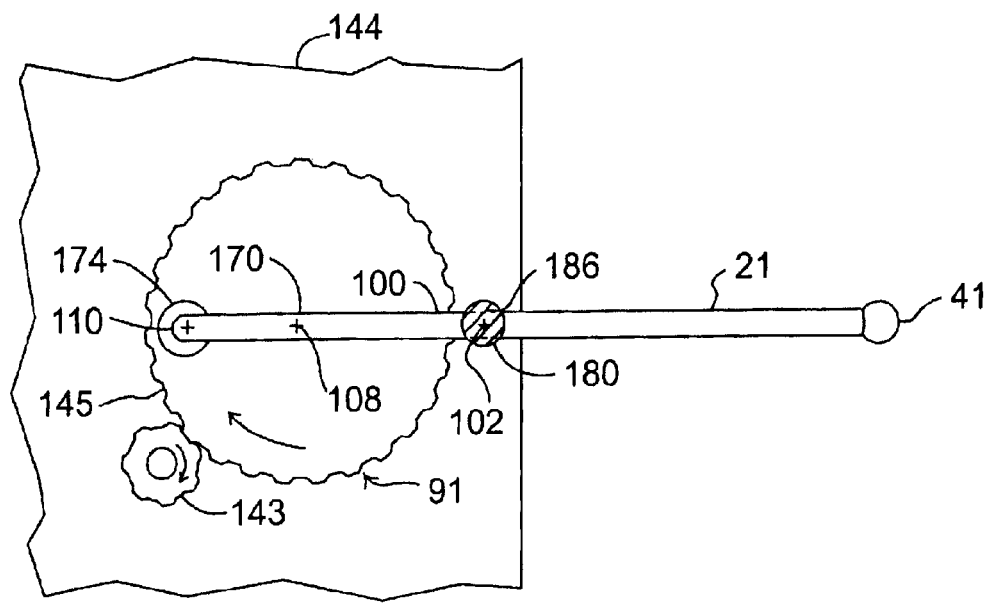
FIG. 36 is a plan view of the alternate crank and lever embodiment taken along section line 36—36 of FIG. 35.

Again, the crank gear 91 can be driven in myriad ways. For example, an electric motor (not shown in FIG. 35) could be mounted on the top frame plate 146 with a pinion gear 143 (see FIGS. 16–18 and 36) mounted on a gear reduction assembly 142 (FIGS. 16–18) engaged with gear teeth 145 (FIG. 36) around the periphery of the crank gear 91, as described above. Also, as described above, a plurality of crank mechanisms can be ganged and driven together by idler gears that engage gear teeth on several adjacent crank gears.

Figure 37:
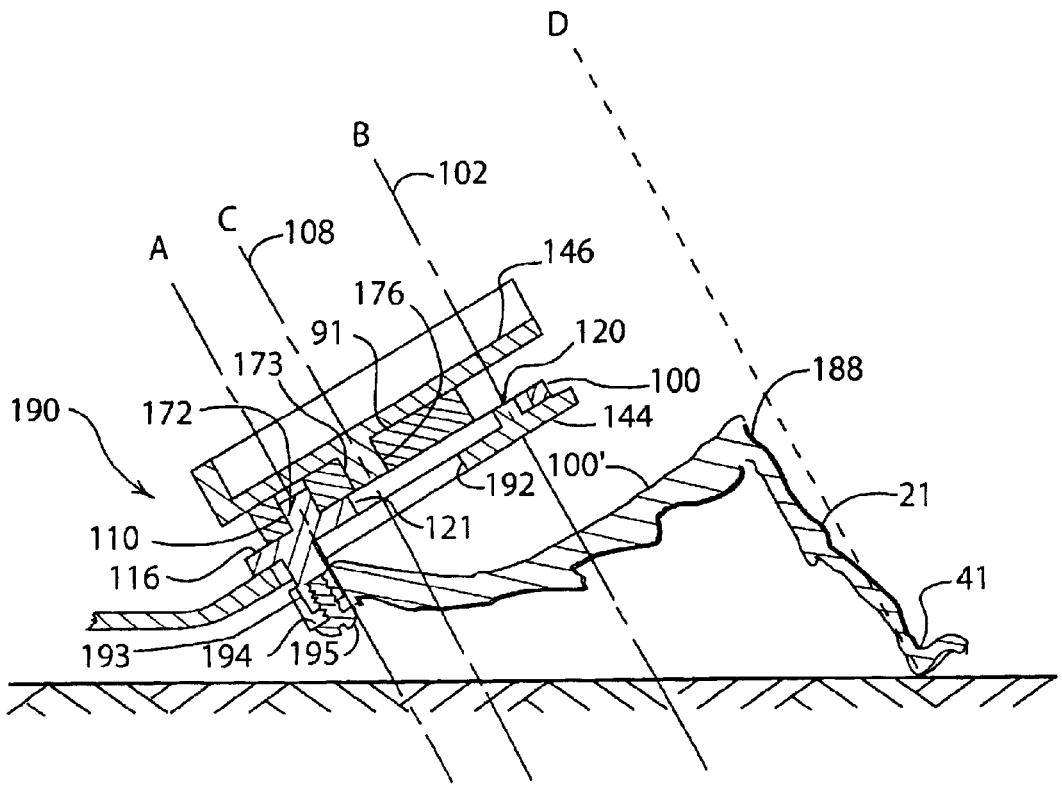
FIG. 37 is an elevation view in cross-section of another variation of the invention in which the leg drive and attachment is under the crank gear.

Another variation 190 of the drive mechanism, which is shown in FIG. 37, has a modified leg lever 100' that extends laterally outward only far enough so that its slotted hole 121 receives the pivot pin 120 for longitudinal and pivotal motion of the leg lever 100 as described above for the other crank drive embodiments of FIGS. 6, 10, and 35 described above. Then, instead of the leg lever 100 continuing to extend laterally to a knee 188 or to a leg strut 21, as in the embodiments of FIGS. 6, 10, and 35, an elongated leg lever extension 100' extends from the proximal end 116 of the leg lever 100 downwardly and laterally outwardly under the leg lever 100 to a knee 188, which continues as leg strut 21 to the foot 41 at the distal end of leg strut 21. This variation or embodiment 190 is particularly useful as a crank and lever mechanism for beetle-like devices in which legs protrude from the belly more than from the lateral sides of the object, thus is sometimes hereinafter referred to as the "under-belly" leg embodiment.

In this under-belly leg embodiment 190, the crank gear 91 is rotatably mounted on a spindle or crank axle 176, which protrudes downwardly from the top frame plate 146 and defines the crank axis 108. The leg lever 100 is sandwiched slideably between the crank gear 91 and the bottom frame plate 144 and has a crank pin 110 that protrudes upwardly from a location on the leg lever 100 adjacent the proximal end 116 of the leg lever 100 into a crank pin hole 172 in the crank gear 91. Therefore, as the crank gear rotates about the crank axis 108, it drives the leg lever 100 to move laterally and pivotally in relation to the pivot pin 120, which protrudes upwardly from the bottom plate 144 and through the slotted hole 121 in the leg lever 100.

As shown in FIG. 37, a leg mounting shaft 193 extends downwardly from the leg lever 100 through a large hole 192 in the bottom plate 144. The leg lever extension 100' extends laterally from a socket 194, which mounts on the shaft 193 in a solid, unrotatable, and immoveable manner and is retained there by a fastener, for example, a threaded and/or self-tapping screw 195. It is preferable, but not essential, that the leg lever extension 100' and the leg strut 21 extend laterally outward far enough to provide an appropriate distance AD to produce the uniform rectilinear stride strokes and arcuate, fast return step strokes, as explained above. The shaft 193 can be splined or shaped, for example, with a hexagonal or other polyhedronal periphery to mate or engage with a similar internal shape in the socket 194 to prevent undesired rotation of the socket 194 and leg lever extension 100' in relation to the leg lever 100. As explained for other embodiments above, the crank gear 91 can be driven by a pinion gear (not shown in FIG. 37) and electric motor (not shown in FIG. 37) or other suitable drive mechanism.

Figure 38:
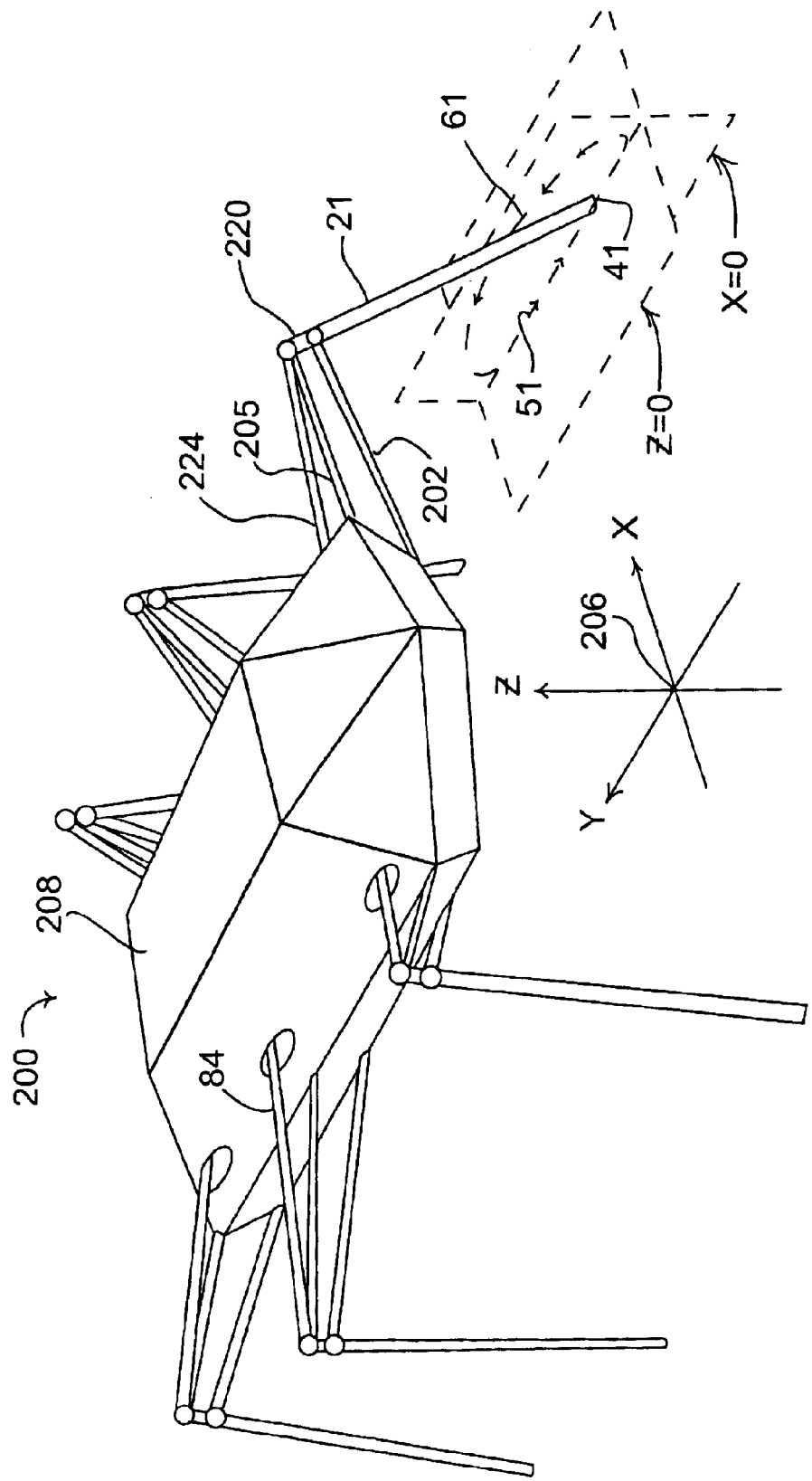
FIG. 38 is a perspective diagrammatic view of another embodiment of the invention that uses passive and active struts along with crank angular motion producing components to produce uniform rectilinear motion of a foot.
Figure 39:
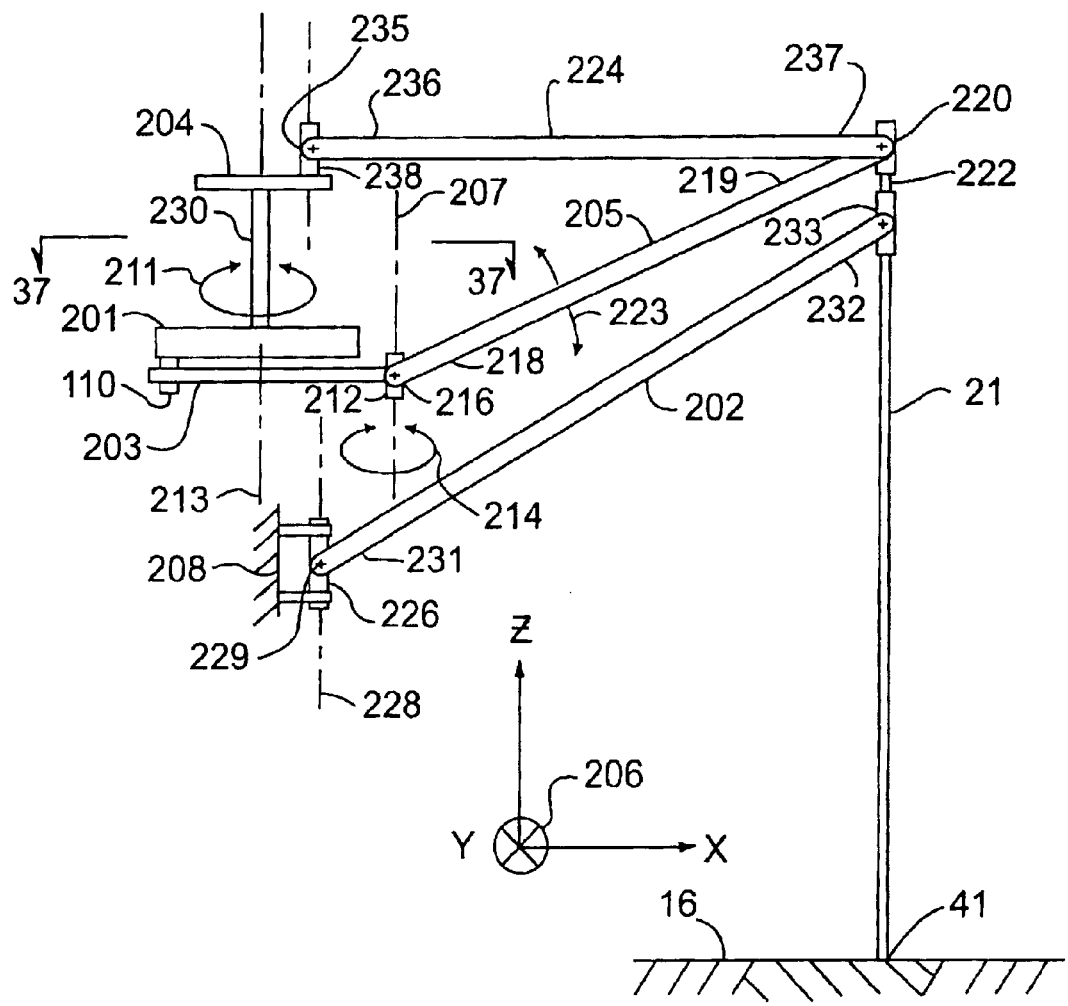
FIG. 39 is an elevation diagrammatic view of the crank and lever mechanism of the FIG. 38 embodiment of the invention.

While all of the crank and lever drive systems described above achieve lifting the foot 41 above the support surface 16 during the step stroke 61 portion of the foot path by tilting the crank drive systems with respect to the surface 16, the alternate embodiment of the invention shown in FIGS. 38 and 39 achieves such lift in a different manner. In this alternate embodiment 200, the uniform velocity for the stride stroke is obtained by using the first crank 201 and pivotal leg lever 203 to generate the necessary angular profile according to Equation (5). A passive strut 202 is used to maintain planar motion of the foot 41 while a second crank 204 is used to further constrain the motion of the foot 41 to rectilinear for the stride stroke 51 and to provide the required lifting of the foot 41 for the step stroke 61.

FIG. 38 is a diagrammatic illustration of the object 200 equipped with the alternate embodiment ambulatory leg structure and control components, which are illustrated diagrammatically in FIG. 39. A right-handed coordinate system 206 is shown for reference in illustrating this embodiment. In FIGS. 38 and 39, the desired forward motion direction of the object 200 is assumed to be along the Y-axis, which, in FIG. 39, is perpendicular to, and points into the plane of the paper.

Figure 40:
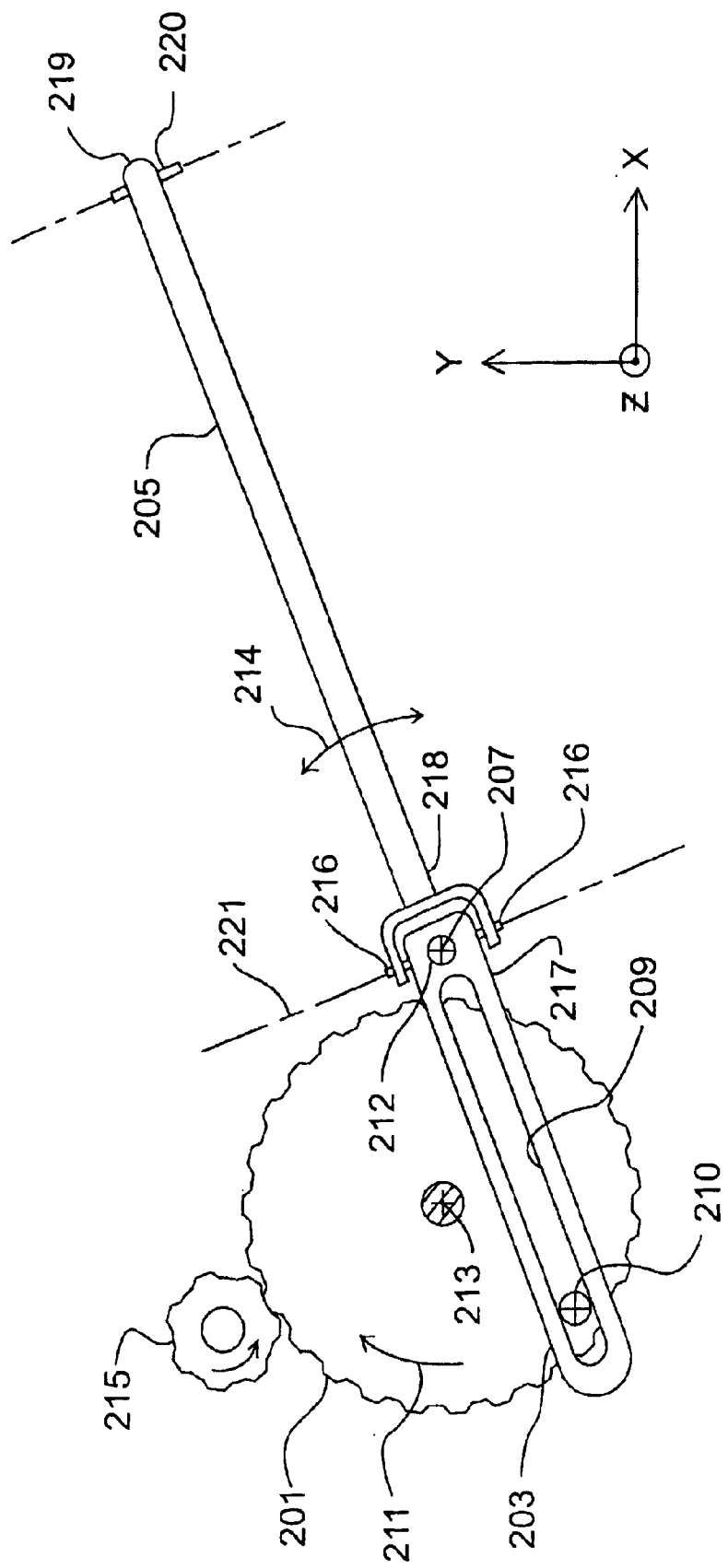
FIG. 40 is an enlarged plan view of the first crank and leg lever mechanism of FIG. 38 taken substantially along section line 40—40 in FIG. 39.

As best seen in FIGS. 39 and 40, the leg lever 203, including its thigh segment 205, pivots about the pivot axis 207, which is in a fixed location with respect to the body 208 (FIG. 38), to create the desired angular profile according to Equation (5). However, the leg lever 203 does not slide longitudinally back and forth in relation to the pivot axis 207 in this embodiment. Instead, the leg lever 203 has a slotted hole 209 that receives the crank pin 210, instead of the pivot pin 212. Therefore, as the first crank 201 rotates about the crank axis 213, as indicated by the arrow 211 (or in the opposite direction), the crank pin 210 causes the leg lever 203 and its thigh segment 205 to pivot back and forth, as indicated by arrow 214, about the pivot axis 207 in the angular profile of Equation (5). Again, the crank 201 is illustrated in FIG. 40 as a gear driven, for example, by a pinion 215, but it could also be a wheel, pulley, lever, or any other rotatable device and can be driven in any of myriad ways that would be obvious to persons skilled in mechanical arts.

The pivot axis 207 for the pivotal motion 214 of the leg lever 203 is essentially vertical, or parallel to the Z-axis of the coordinate system 206, so the pivotal movement 214 of the leg lever 203 about the pivot axis 207 is essentially in an X-Y plane. However, the proximal end 218 of the thigh segment 205 of the leg lever 203 is connected in a pivotal manner, such as by hinge pins 216 to the base portion 217 of the leg lever 203, as illustrated in FIG. 40, so that distal end 219 of the thigh portion 205 can also move or pivot upwardly and downwardly, in the Z-direction, about a horizontal pivot axis 221, as indicated by the arrow 223 in FIG. 39. Of course, there are myriad other kinds of pivotal connections known to persons skilled in the art that can also be used to allow the distal end 219 of the thigh segment 205 to move or pivot back and forth in an X-Y plane as well as vertically in the Z-direction, such as ball joints, universal joints, and others.

The knee connection 220 at the distal end 219 of the thigh segment and the proximal end 222 of the calf or lower leg strut 21 is also a pivotal or hinge connection, as best seen in FIG. 39. The alignment of the knee connection 220 is such that the knee 220 and proximal end 222 of the lower leg strut 21 and the foot 41 are in a plane that also contains the pivot axis 207 and the proximal and distal ends 218, 219 of the thigh segment 205. (If the thigh segment 205 and the lower leg strut 21 are straight, they would also lay in that same plane.) In other words, when viewed from above, the pivot pin 212, hinge 220, and foot 41 are colinear, i.e., all in the same straight line, and, when the crank 201 rotates, such straight line pivots about the pivot axis 207 and is the basis for obtaining the angular profile of Equation (5) for moving the foot 41 at a constant velocity.

To achieve rectilinear motion of the foot 41, while the first crank 201 swings the leg lever 203, thigh segment 205, knee 220, lower leg strut 21, and foot 41 in the angular profile of Equation (5), the passive strut 202 constrains the lower leg strut 21 in a manner that keeps the foot 41 in the plane X=0 (FIG. 38), and the active strut 224 constrains the lower leg strut 21 to keep the foot 41 in the plane Z=0 (FIG. 38) during the stride stroke 51. Therefore, when the foot 41 is kept in the plane X=0 by the passive strut 202 and in the plane Z=0 by the active strut 224, the result is that the foot 41 is constrained to move only in the rectilinear (i.e., straight) line 51, where the plane X=0 intersects the plane Z=0 (FIG. 38). Consequently, this combination of the motion induced by the first crank 201 as constrained by the passive strut 202 and by the active strut 224 results in the desired uniform rectilinear motion of foot 41 along the straight line path 51 for the stride stroke according to this invention. At the end of the rectilinear stride-stroke path 51, the active strut 224 is also used to raise the foot 41 above the plane Z=0 for the step stroke 61, when the foot 41 is accelerated and returned rapidly to the beginning of the next stride stroke 51.

While is it not necessary for the foot 41 to be kept in the X=0 (vertical) plane during the step stroke 61, there are advantages in doing so for some applications. For example, maintaining the foot 41 in the X=0 (vertical) plane allows for the possibility of some form of yieldable suspension (not shown) that would accommodate some vertical movement of the body 208 in relation to the ground or other support surface without unnecessary binding.

As shown in FIG. 39, the passive strut 202 is anchored to the body 208 or other frame structure of the object 200 by a pivotal connection 226 that allows the passive strut to pivot about both a vertical axis 228 and a horizontal axis 229 in order to accommodate the motion imposed on the lower leg strut 21 by the thigh segment 205 and the active strut 224. However, the pivotal connection 226 does not allow any lateral (X-direction), longitudinal (Y-direction), or vertical (Z-direction) motion of the proximal end 231 of the passive strut 202 in relation to the body 208. The distal end 232 of the passive strut 202 is pivotally connected 233 to the lower leg strut 21 below the knee 220, preferably with a ball joint or other connector 233 that allows pivotal motion about two orthogonal axes in the Y and Z directions. Therefore, the passive strut 202 only resists or allows certain motions of the lower leg strut 21. It does not motivate any motions on the lower leg strut 21. The active strut 224, on the other hand, is motivated by the second crank 204 to impart certain motions to the lower leg strut 21, planar motion at the foot 41. There can be many factors involved in choosing an optimal solution, including the ease with which the result can be fabricated and its suitability for an intended application. As an example, there is a range of placements for the pivotal connection 226 to the body 208 that allow for a simple linkage to be used, whereas other possibilities for such placement of connection 226 may present interference with other components.

One example solution is presented here for illustration of the invention in which the placements of the connections 226 and 233 of the passive strut 202 pose no such interference with other components of the crank and lever mechanism. The parameters of this particular example design are considered relative to the X, Y, Z coordinate system 206, where the coordinates (0, 0, 0) are set arbitrarily at the pivotal connection 212, 216 of thigh segment 205 to the leg lever 203. Therefore, with this coordinate placement, the vertical plane desired for the foot 41 is not X=0, as illustrated in FIG. 35, but is some offset value of X. In this example, the vertical plane in which the foot is desired to be constrained is X=5, i.e., the vertical plane for the foot is offset five (5) inches laterally from the pivotal connection 212, 216. The parameters for this example are (in inches, defined midway through the stride stroke 51):

TABLE 1

|  | X | Y | Z |
|---|---|---|---|
| Plane of motion | 5 | | |
| Coordinates of 216 | 0 | 0 | 0 |
| Coordinates of 220 | 5 | 0 | 2 |
| Coordinates of 226 | −0.9467 | 0 | −1 |
| Coordinates of 233 | 5 | 0 | 1 |
| Coordinates of 41 | 5 | 0 | −5.5 |

For this set of parameters for the configuration of FIG. 39, the desired range of motion for the foot 41 is −3.3<Y<3.3, −5.5<Z<−3.9, and X=5. The error of the motion of the foot 41 from the plane X=5 is less than 0.030 inches over an inch of vertical foot motion and less than 0.2 inches over the entire range of motion.

As mentioned above, the foot 41 will move according to the angular profile of Equation (5) (projected on an X-Y (i.e., horizontal) plane. That angular motion profile allows for an essentially constant velocity of the foot 41 during the stride stroke 51 portion of a crank 201 cycle or revolution, and it includes an accelerated and rapidly returning step stroke 61, as described above. During the stride stroke 51, the active strut 84 should hold the foot 41 at a constant Z value, e.g., at Z=0 in FIG. 38, which keeps the foot 41 planted on the support surface and moving in a straight line 51 with respect to the body 208. For the step stroke 61, the active strut 224 (also called the lifting strut) should lift the foot 41 above the support surface 16 (FIG. 39) to keep it from dragging.

The active strut 224 is actuated or driven to perform those functions described above by a second crank 204, which rotates about an axis parallel to the Z-direction (i.e., vertical in relation to a horizontal X-Y support surface), which can be the same as the crank axis 213, as best seen in FIG. 39. The second crank 204 must be synchronized to the angular profile being executed by the thigh segment 205 (projected onto the X-Y plane), which is driven by the first crank 201 as explained above. Therefore, the second crank 204 can be positioned directly above the first crank 201 and can be driven by a vertical shaft 230 connected to both the first crank 201 and the second crank 204 rotating about the crank axis 213. The active strut 224 is connected by a pivotal connector 235 at its proximal end 236 to a second crank pin 238 in a manner that allows pivotal motion of the active strut 224 in both a vertical plane and a horizontal plane. It is also connected pivotally at its distal end 237 to the knee 220 by a pivotal connector, such as a ball joint, that allows pivotal motion about both a horizontal axis and a vertical axis in relation to both the thigh segment 205 and the leg strut 21.

Figure 41:
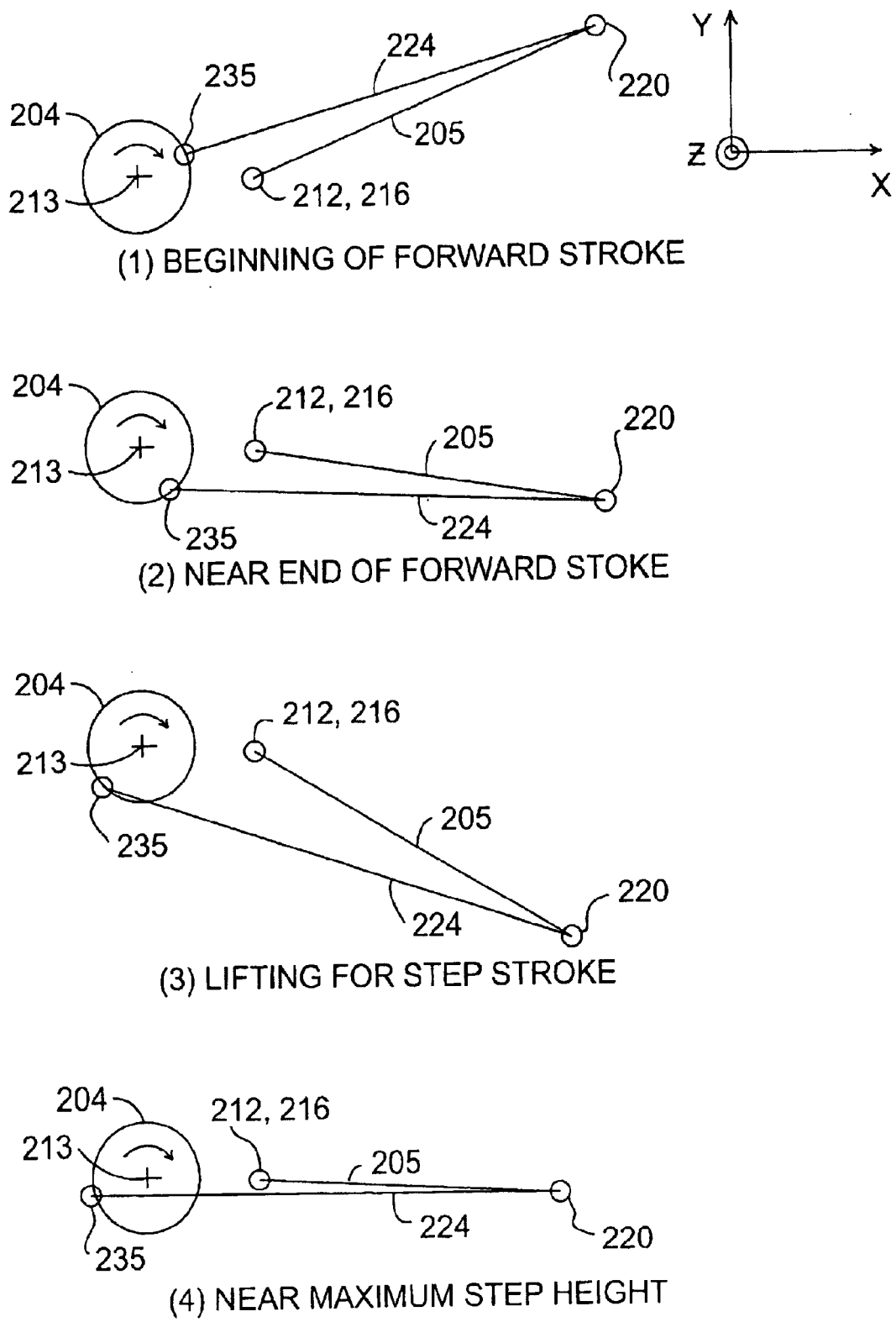
FIG. 41 is a diagrammatic plan view of the second (lifting) crank and active (lifting) strut in relation to the thigh segment at four successive angular rotation points in a cycle.

Empirically, the second crank 204 should move as shown in FIG. 41, which is a plan view of the second crank 204, the active strut 224, the thigh segment 205, and the knee 220 in four successive points of a cycle, i.e., of a crank 224 revolution. During the stride stroke (1) and (2), the knee rotates generally in the same direction as the second crank 224, which is the kind of motion needed to keep the foot 41 at a constant value of Z, i.e., not lifting the foot 41 off the support surface. However, at the start of the step stroke 61, the thigh segment 205 begins to move forwardly, while the second crank 204 continues to rotate the pivotal crank connection 335 in its circular path. In this phase or part of the cycle, the knee 220 and the crank connection 335 move in generally opposite directions in relation to each other, which provides for a relatively abrupt lifting action on the knee 280 and the lower leg strut 21 to lift the foot 41 into the step stroke 61. Near the middle of the step stroke (4) in FIG. 41, the crank connection 235 is fartherest away from the pivot axis 207 at pivotal connection 212, 216 and lifts the foot 41 to its highest point.

Once this overall scheme has been determined, numerical optimization can be used to finalize the design. The placement of the second crank axis 213 and the radius are determined numerically and are only loosely coupled to the determination of the other leg parameters determined earlier for keeping the motion planar.

The following parameters were determined numerically as optimized for rectilinear motion with a step by virtue of the second crank 204 described above appropriately positioned and of an optimum radius:

TABLE 2

|  | X | Y | Z |
|---|---|---|---|
| Plane of motion | 5 |  |  |
| Coordinates of 216 | 0 | 0 | 0 |
| Coordinates of 220 | 5 | 0 | 2 |
| Coordinates of 226 | −0.9466 | 0 | −1 |
| Coordinates of 233 | 5 | 0 | 1 |
| Coordinates of 41 | 5 | 0 | −5.5 |
| Crank axis | −2.729 | 0 |  |

Radius of second crank 0.33.

Figure 42:
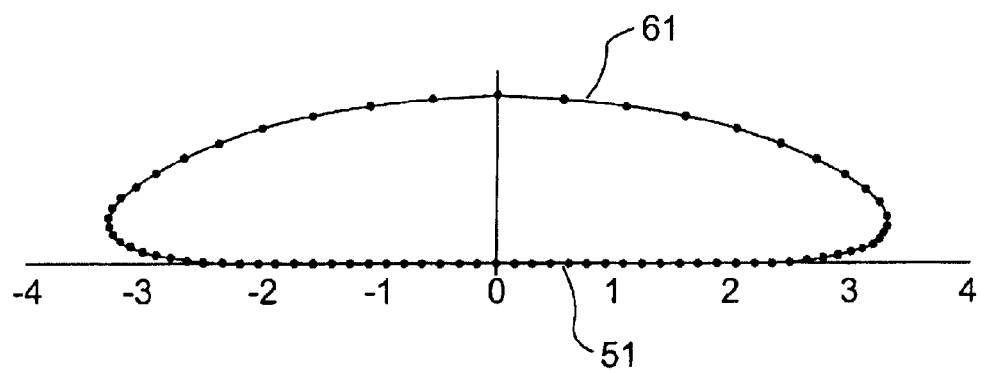
FIG. 42 is a graphical profile of the foot path in relation to the body produced by the ambulatory mechanism of the FIG. 39 embodiment.

Since the foot 41 is constrained to a plane, e.g., the plane X=0 in FIG. 38, by the passive strut 202, and since the knee 220 maintains the foot to be colinear with the pivotal connection 212, 216 as explained above, and, further, since the angular profile of the sliding leg lever 203 and thigh segment 205 approximates the angular profile of Equation (5), then it is apparent that the foot 41 will move in uniform rectilinear motion 51 as the first crank 201 moves through some large part of a revolution. Such motion of the foot 41 in the plane X=0 relative to the body 208 is shown in FIG. 42. As illustrated in the graph of FIG. 42, the motion of the foot 41 is very nearly a straight line during the stride stroke 51 portion of a foot motion cycle, and the uniform spacing of the tick marks during the stride stroke 51 indicates that the foot 41 motion is nearly constant velocity. Then, as the foot 41 steps upwardly, the ticks in the step stroke 61 are non-uniformly spaced farther apart, which indicates acceleration of foot 41 into the raised step stroke 61 for rapid return and then deceleration back to the beginning of another stride stroke 51.

Figure 43:
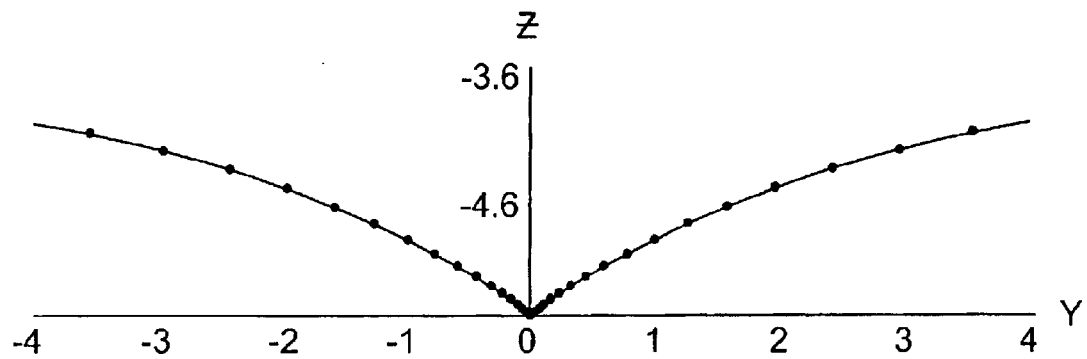
FIG. 43 is a graphical profile of the foot path of FIG. 42 in relation to a support surface.

As viewed from a fixed point on the ground or support surface, the foot 41 will scribe the path shown in FIG. 43. This profile is nearly ideal in that the foot 41 is lowered and raised in a nearly vertical manner, which facilitates stepping over obstacles and prevents binding from any foot dragging that would otherwise occur. Also, as shown in FIG. 43, during the stride stroke, the foot 41 remains nearly perfectly planted, e.g., at zero in FIG. 43.

Figure 44:
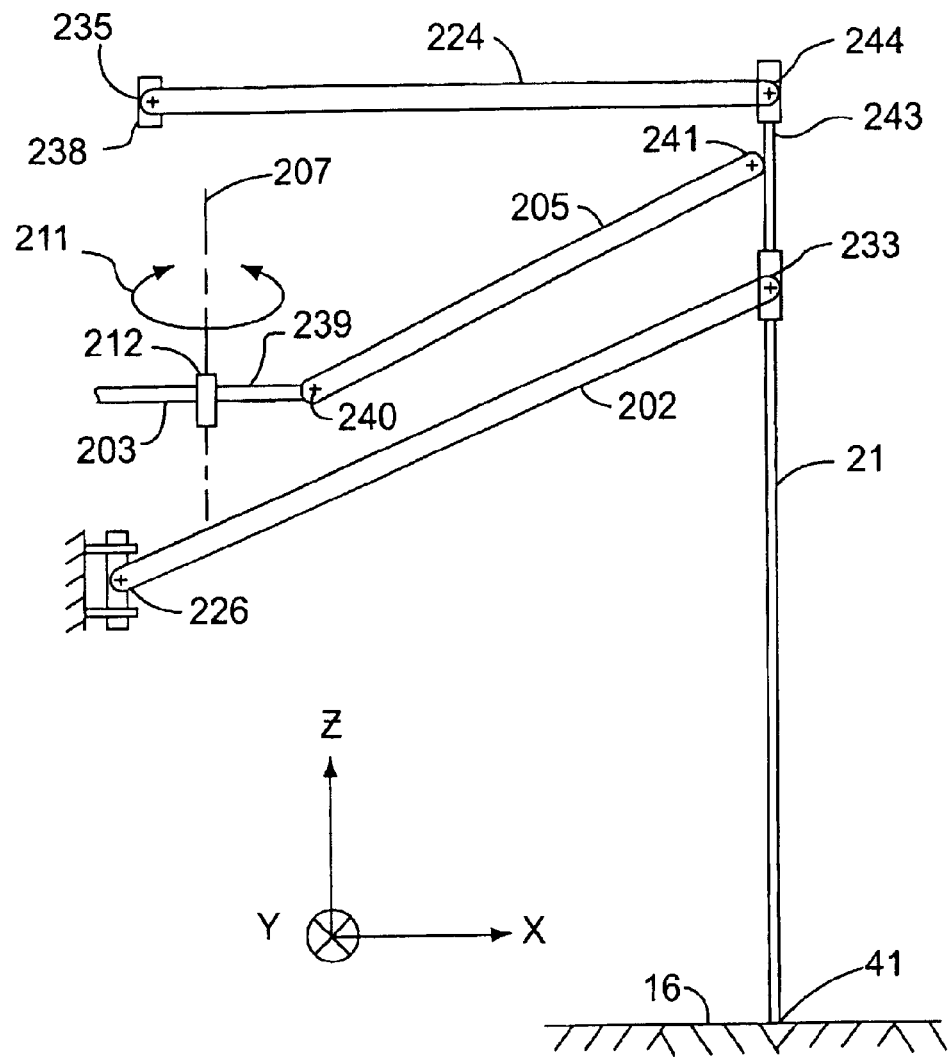
FIG. 44 is a variation of the FIG. 39 embodiment of the invention with simplified pivotal joint connections.

A variation of the crank and lever drive of FIGS. 38–40 described above is shown in FIG. 44. This variation eliminates the need for the complex pivot connections at 212, 216 and 220 in FIG. 39. As shown in FIG. 44, the point of pivotal connection 240 of the thigh portion 205 to the leg lever 203, rather than being at the origin, is extended laterally a distance 239 from the pivot origin 212 at pivot axis 207 so that it actually follows the path of an arc, i.e., pivots, in the X-Y plane about the axis 207, which is parallel to the Z-axis (vertical) and passes through the origin. The thigh segment 205 pivots about the connection point 240 such that the three points at 240, 241, 212 define a plane that contains the Z-axis. This arrangement simplifies the joints at connections 240 and 212 as compared to the complex joint 212, 216 of the previous embodiment described above, because only one axis of rotation has to be accommodated at each connection. Likewise, the complex knee joint 220 of the previous embodiment is also simplified in this FIG. 44 embodiment by the extension 243 of the leg strut 21 above the simplified pivotal connection 241 to an additional pivotal connection 244 of the active strut 224 to the leg strut 21 so that both the thigh segment 205 and the active strut 224 do not have to be connected to the lower leg strut 21 at the same pivot axis. The pivotal connection 244, however, still needs to be able to pivot about a vertical axis and a horizontal axis, i.e., two degrees of freedom rotation. The first crank 201 and second crank 204 are not shown in FIG. 44, because they are substantially the same as those cranks 201, 204 in FIG. 36. Optimization of this FIG. 44 variation is possible to result in performance substantially identical to that of the FIG. 39 embodiment.

The design of this variation of FIG. 44 was optimized in a two-step approach keeping in mind the possibility of adding suspension (not shown). Without suspension, the foot 41 is required only to be colinear during the stride stroke 51. Addition of suspension would require that the foot 41 be constrained to a plane parallel to the Y-Z plane, e.g., the plane X=0 in FIG. 35, throughout its range of motion. Therefore, two separate optimizations were made. The first optimization fixes the position of the pivotal anchor connection 226 for the passive strut 202 for coplanar foot 41 motion over the full range of motion. The second optimization set the position and radius of the second (lifting) crank 204 (not shown in FIG. 44) for optimum stepping. The results of the first optimization are shown in Table 3.

TABLE 3

|  | X | Y | Z |
|---|---|---|---|
| Plane of motion | 5 |  |  |
| Coordinates of 240 | 0.500 | 0 | 0 |
| Coordinates of 241 | 5.5 | 0 | 2.005 |
| Coordinates of 226 | −0.877 | 0 | −1.4 |
| Coordinates of 233 | 4.932 | 0 | 1.008 |
| Coordinates of 41 | 4.973 | 0 | −5.476 |

Figure 45:
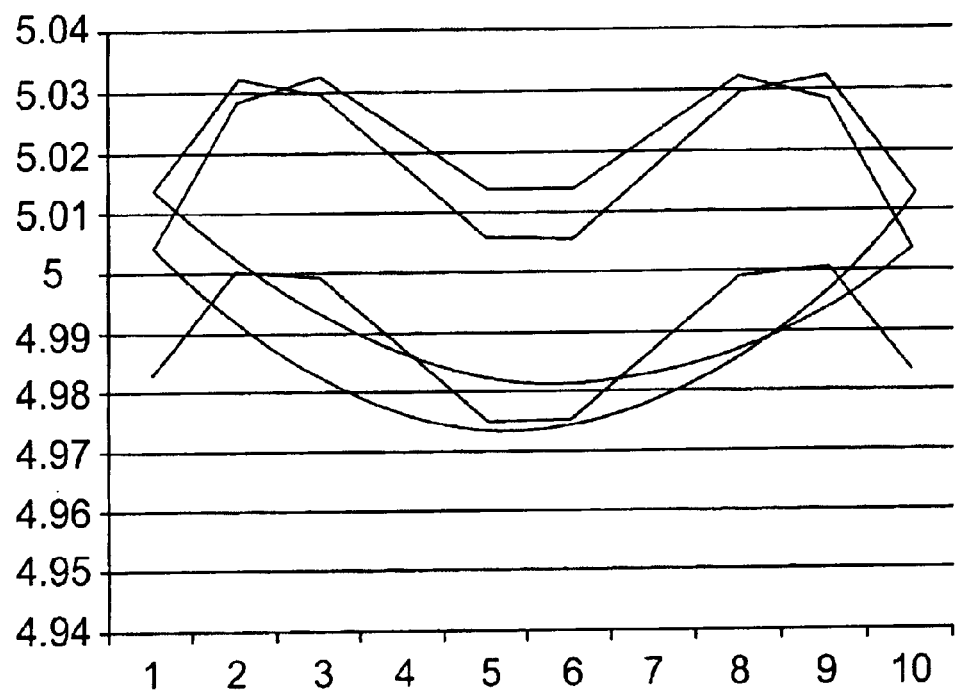
FIG. 45 is a graph of foot motion through various paths of motion used in an example numerical optimization of the FIG. 44 embodiment of the invention.

The desired range of motion for the foot 41 is −2.7<Y<2.7, −5.9<Z<−5.0, and X=5. The error of the motion of the foot 41 from the plane X=5 is depicted in FIG. 45. Plotted are six curves representing the X coordinate of the foot 41 through six paths in the plane defining the range of motion. Deviations from the plane X=5 are within 0.030 inch.

Figure 46:
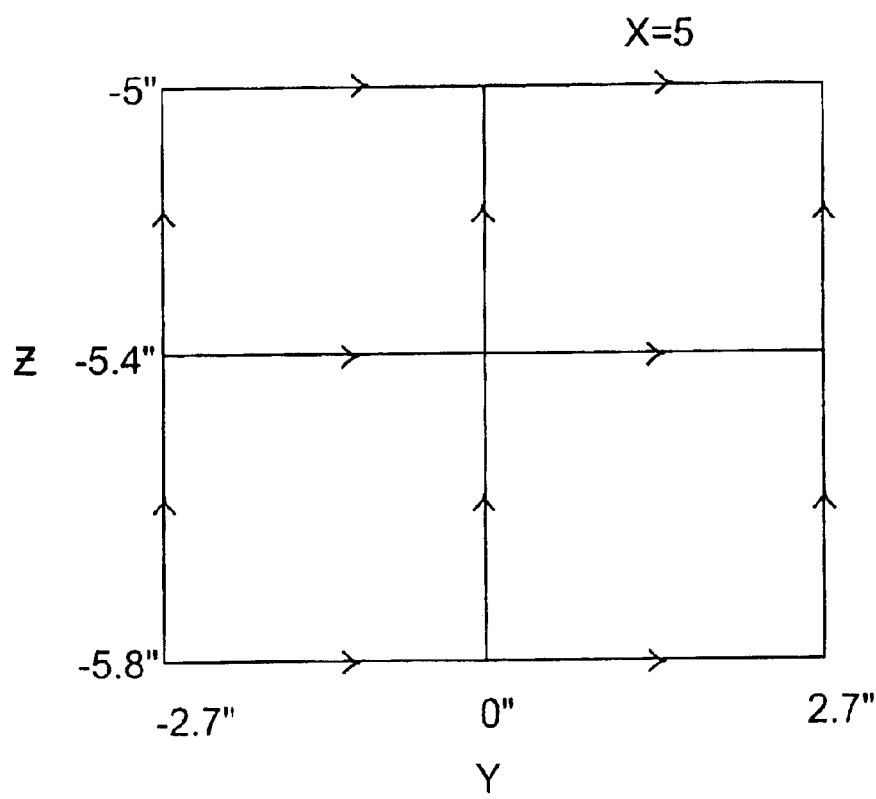
FIG. 46 is a diagram of the six example paths in the X=5 plane used in the numerical optimization illustrated in FIG. 45.

The six paths are shown in FIG. 46. The error function used for optimization was based on the integration along these six paths.

This method assumes that other points in the plane not along these paths have errors of this order or smaller. Spot-checking the curve between these paths validated this assumption. The interpretation of the error in FIG. 45 is that with the appropriate choice of parameters the foot 41 is constrained to move in a plane throughout the desired range of motion to within an error of 0.6%.

The second optimization is performed to find the best location for the drive axis 213 and the radius of the second (lifting) crank 204. The full set of optimized parameters is given in Table 4. The characteristic motion of the foot 41 is virtually indistinguishable from that of the crank and lever mechanism of FIG. 39.

TABLE 4

|  | X | Y | Z |
|---|---|---|---|
| Plane of motion | 5 |  |  |
| Coordinates of 240 | 0.500 | 0 | 0 |
| Coordinates of 241 | 5.5 | 0 | 2.005 |
| Coordinates of 226 | −0.877 | 0 | −1.4 |
| Coordinates of 233 | 4.932 | 0 | 1.008 |
| Coordinates of 41 | 4.973 | 0 | −5.476 |
| Crank axis 213 | −2.729 | 0 |  |

Radius of strut crank 0.33.

The foregoing description is considered as illustrative of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention. The words "comprise," "comprises," "comprising," "include," "including," and "includes" when used in this specification are intended to specify the presence of stated features, integers, components, or steps, but they do not preclude the presence or addition of one or more other features, integers, components, steps, or groups thereof.

What is claimed is:

1. Locomotive apparatus for supporting and moving a vehicle, toy, or other body, on a support surface, including a plurality of legs extending from the body, each leg comprising a leg lever having a proximal end portion connected to a drive mechanism and a distal end portion adapted for contacting and supporting the body on the support surface, wherein the drive mechanism and the leg are characterized by:

the proximal end portion of the leg lever connected to a crank and constrained at a pivot adjacent the crank to move the distal end portion of the leg lever in a linear path in relation to the body as the crank rotates through a part of a 360-degree revolution and to lift the distal end portion of the leg lever and return it to a starting point of the linear path as the crank completes the 360-degree revolution.

2. The locomotive apparatus of claim 1, wherein constant angular velocity of the crank produces constant linear velocity of the distal end portion along the linear path.

3. The locomotive apparatus of claim 1, wherein constant angular velocity of the crank produces constant speed of the distal end portion along the linear path and greater speed of the distal end as it lifts and returns to the starting point.

4. The locomotive apparatus of claim 1, wherein the crank is connected to a motor that can drive the crank to rotate at a constant forward angular velocity.

5. The locomotive apparatus of claim 4, wherein the motor can also drive the crank to rotate at variable forward angular velocities as well as at constant and variable reverse angular velocities.

6. The locomotive apparatus of claim 1, wherein the crank rotates at a radial distance about a crank axis, said crank axis being positioned at a lateral distance from the pivot, and wherein the radial distance and the lateral distance are sized in a proportional relation to each other that produces an angular relationship very close to Q=ATAN (VR/ωd), where R is an angle between a line extending through the crank axis and the pivot and a line extending through the crank axis and the crank, where Q is an angle between the line extending through the crank axis and the crank and a line extending through the pivot and the crank, where ω is the angular velocity of said crank, where V is the linear velocity of the distal end portion, and where d is a distance between the pivot and the linear path on a line that extends through the crank axis and the pivot and intersects the linear path, so that constant angular velocity ω of the crank produces constant linear velocity V of the distal end portion in the linear path.

7. The locomotive apparatus of claim 6, wherein the leg lever is constrained against lateral movement in relation to the pivot, but is slideable longitudinally in relation to the pivot.

8. The locomotive apparatus of claim 7, wherein the leg lever is slotted to be slideable with respect to the pivot.

9. The locomotive apparatus of claim 7, wherein the crank axis is tilted at an angle less than 90-degrees and greater than zero degrees in relation to the support surface.

10. The locomotive apparatus of claim 9, wherein the leg lever moves in a plane that is perpendicular to the crank axis.

11. The locomotive apparatus of claim 6, wherein the radial distance and the lateral distance are sized in a proportion to each other that causes the distal end portion to move in the linear path at a constant velocity during about 270 degrees of rotation of the crank.

12. The locomotive apparatus of claim 11, wherein the vehicle has six legs, three on each side of the body, and wherein the drives for the respective legs are synchronized in a manner that maintains at least two of the legs on each side moving in their respective linear paths at any time.

13. The locomotive apparatus of claim 11, wherein the vehicle has four legs, two on each side of the body, and wherein drives for the respective legs are synchronized in a manner that maintains at least three of the four legs moving in their respective linear paths at any time.

14. The locomotive apparatus of claim 13, including two faux legs, one on each side of the body between the other two legs on such side, the faux leg on one side being slightly too long and the faux leg on the other side being slightly too short, and further wherein said faux legs are pivotal rearwardly from vertical, but not forwardly from vertical, so that the longer faux leg drags during forward motion of the other four legs and lifts a side of the body and the two legs on that side of the body during reverse motion of the other four legs.

15. The locomotive apparatus of claim 6, including a downwardly extending leg strut hinged to the distal end to form a knee hinge, a stabilizer strut hinged to the leg strut below the knee hinge, and a lift strut connected to the knee hinge, said lift strut being connected to a second crank that is synchronized with the first crank to pull the knee hinge inwardly toward the body and thereby raise the knee hinge and leg strut as the first crank drives the distal end back to the start point of the linear path.

16. The locomotive apparatus of claim 15, wherein the leg lever is slotted to be longitudinally slideable in relation to the crank and is constrained against lateral and longitudinal motion at the pivot.

17. The locomotive apparatus of claim 1, wherein said distal end is a foot.

18. The locomotive apparatus of claim 1, including a foot at said distal end.

19. Apparatus for moving a distal end of a mechanical leg in a cycle comprising a stride stroke to support and propel an object on a support surface and a step stroke following the stride stroke to lift the distal end above the support surface and return it to begin another stride stroke, said apparatus comprising:

means for moving the distal end at a constant velocity during the stride stroke and at accelerating and decelerating velocities during the step stroke; and means for maintaining movement of the distal end to a substantially straight path in relation to the object during the stride stroke and to an arcuate path in relation to the object and above the support surface during the step stroke.

20. The apparatus of claim 19, wherein the means for moving the distal end includes crank means connected to the mechanical leg for pivoting the mechanical leg about a pivot axis.

21. The apparatus of claim 20, wherein the crank means includes a crank pin that rotates at a radial distance about a crank axis, said mechanical leg being connected to said crank pin in a such a manner that rotation of the crank pin about the crank axis causes the mechanical leg to pivot back and forth about the pivot axis.

22. The apparatus of claim 21, wherein the pivot axis is positioned adjacent the crank means at a distance from the crank axis that is greater than said radial distance.

23. The apparatus of claim 22, wherein the mechanical leg is configured in a manner that has the distal end positioned farther from the crank axis than the pivot axis is positioned from the crank axis so that there is a stride plane, which extends through the distal end and is parallel to the pivot axis perpendicular to a first straight line that extends through the pivot axis and the crank axis.

24. The apparatus of claim 23, wherein there is a distance d along said first straight line between the pivot axis and the stride plane.

25. The apparatus of claim 24, wherein there is a second straight, which is perpendicular to the crank axis and extends through the crank axis and the crank pin, and wherein there is a third straight line, which is perpendicular to the pivot axis and extends through the pivot axis and the crank pin.

26. The apparatus of claim 25, wherein there is an angle R between the first straight line and the second straight line and an angle Q between the first straight line and the third straight line, and further wherein the angle R and the angle Q both change as the crank pin rotates about the crank axis.

27. The apparatus of claim 26, wherein the radial distance from the crank axis to the crank pin and the lateral distance between the crank axis and the pivot axis are sized in a proportional relation to each other that results in a relationship between the angles R and Q, which is modeled based on the angular profile $Q=ARCTAN(VR/\omega d)$, a portion of each revolution of the crank where V is said constant velocity of the distal end in said rectilinear path in said stride plane, $\omega$ is angular velocity of the crank pin rotating about the crank axis, and d is said distance along said first straight line between the pivot axis and said stride plane.

28. A method of supporting and propelling an object over a support surface with a plurality of mechanical legs, comprising:

connecting each mechanical leg to a crank pin that is rotatable at a radial distance about a crank axis;

constraining such mechanical leg in a pivotal manner at a pivot axis that is parallel to the crank axis and positioned at a lateral distance from the crank axis, said lateral distance being greater than the radial distance;

sizing the radial distance and the lateral distance to model an angular profile of $Q=ARCTAN(VR/\omega d)$ to obtain a constant velocity V of a distal end of said mechanical leg in relation to angular velocity $\omega$ of the crank pin rotation about the crank axis for a stride portion of a revolution of the crank pin about the crank axis, where R is an angle between a plane that includes the crank axis and the pivot axis and a plane that includes the crank axis and the crank pin, where Q is an angle between a plane that includes the crank axis and the pivot axis and a plane that includes the crank axis and a point of contact of the mechanical leg on the support surface, and d is a perpendicular distance from the pivot axis to a plane that is parallel to the pivot axis and extends through the point of contact of the mechanical leg on the support surface; and rotating the crank pin about the crank axis.

29. The method of claim 28, including constraining the mechanical leg in a manner that maintains the point of contact of the mechanical leg on the support surface in a rectilinear path during the stride portion of a revolution of the crank pin about the crank axis.

30. The method of claim 29, including lifting the mechanical leg after the stride portion of a revolution of the crank pin about the crank axis and moving it above the support surface during the remainder of the revolution back to a beginning point to start another stride portion of a revolution.

* * * * *